US012579485B2

(12) United States Patent
　Ishida

(10) Patent No.: US 12,579,485 B2
(45) Date of Patent: Mar. 17, 2026

(54) MANAGEMENT SYSTEM FOR UNMANNED MOBILE SERVICE EQUIPMENT

(71) Applicant: TAISHO SKY BUILDING, INC., Tokyo (JP)

(72) Inventor: Kazuharu Ishida, Tokyo (JP)

(73) Assignee: TAISHO SKY BUILDING, INC., Tokyo (JP)

( * ) Notice: Subject to any disclaimer, the term of this patent is extended or adjusted under 35 U.S.C. 154(b) by 0 days.

(21) Appl. No.: 18/909,941

(22) Filed: Oct. 8, 2024

(65) Prior Publication Data

US 2025/0037042 A1　Jan. 30, 2025

Related U.S. Application Data

(63) Continuation of application No. PCT/JP2022/017361, filed on Apr. 8, 2022.

(51) Int. Cl.
*G06Q 10/02* (2012.01)
*G05D 1/646* (2024.01)
(Continued)

(52) U.S. Cl.
CPC ............. *G06Q 10/02* (2013.01); *G05D 1/646* (2024.01); *G06Q 10/20* (2013.01); *G06V 40/10* (2022.01); *G06V 40/20* (2022.01)

(58) Field of Classification Search
CPC ........ G06V 40/10; G06V 40/20; G05D 1/646; G06Q 10/20
See application file for complete search history.

(56) References Cited

U.S. PATENT DOCUMENTS

2010/0027847 A1* 2/2010 Ess .......................... G06T 7/246
382/107
2017/0161968 A1 6/2017 Xie et al.
(Continued)

FOREIGN PATENT DOCUMENTS

JP　2002/101333 A　4/2002
JP　2015-138324 A　7/2015
(Continued)

OTHER PUBLICATIONS

Nallusamy, "A Proposed Model for Lead Time Reduction during Maintenance of Public Passenger Transport Vehicles", International Journal of Engineering Research in Africa ISSN: 1663-4144, vol. 23, pp. 174-180 (Year: 2016).*
(Continued)

*Primary Examiner* — Rupangini Singh
(74) *Attorney, Agent, or Firm* — MORGAN, LEWIS & BOCKIUS LLP

(57) ABSTRACT
A management system for an unmanned mobile service device includes a device main body, a management server that manages the device main body, and a terminal device that accepts an operation input by a subscriber. The device main body includes a service performing unit that performs a service without internally receiving a user, and a moving unit that moves the device main body. The management server 3 includes a reservation information setting section that accepts a reservation of the device main body via the terminal device 4 to store reservation information regarding a reserved place in a storage section and set the reservation information, and a movement control section that causes the moving unit to move the device main body to the reserved place based on the reservation information.

33 Claims, 16 Drawing Sheets

(51) Int. Cl.
   *G06Q 10/20*      (2023.01)
   *G06V 40/10*      (2022.01)
   *G06V 40/20*      (2022.01)

(56)          References Cited

U.S. PATENT DOCUMENTS

| | | | |
|---|---|---|---|
| 2022/0253927 A1 | 8/2022 | Ishida | |
| 2022/0318766 A1* | 10/2022 | Saito | G06Q 10/20 |
| 2022/0415139 A1 | 12/2022 | Ishida | |

FOREIGN PATENT DOCUMENTS

| | | | | |
|---|---|---|---|---|
| JP | 2017-503385 A | | 1/2017 | |
| JP | 2019079364 A | * | 5/2019 | |
| JP | 2020181554 A | * | 11/2020 | G06Q 10/02 |
| JP | 6865992 B1 | | 4/2021 | |
| WO | WO2019-135271 | | 7/2019 | |

OTHER PUBLICATIONS

Machine translation of JP2002-101333A, Apr. 5, 2002, 22 pgs.
Machine translation of JP2015-138324A, Jul. 30, 2015, 26 pgs.
Machine translation of JP2019-079364A, May 23, 2019, 2 pgs.
Machine translation of JP2020-181554A, Nov. 5, 2020, 9 pgs.
Taisho Sky Building, Inc., International Search Report and Written Opinion dated Jul. 12, 2022 for PCT/JP2022/017361, 9 pgs.

* cited by examiner

Figure 12:
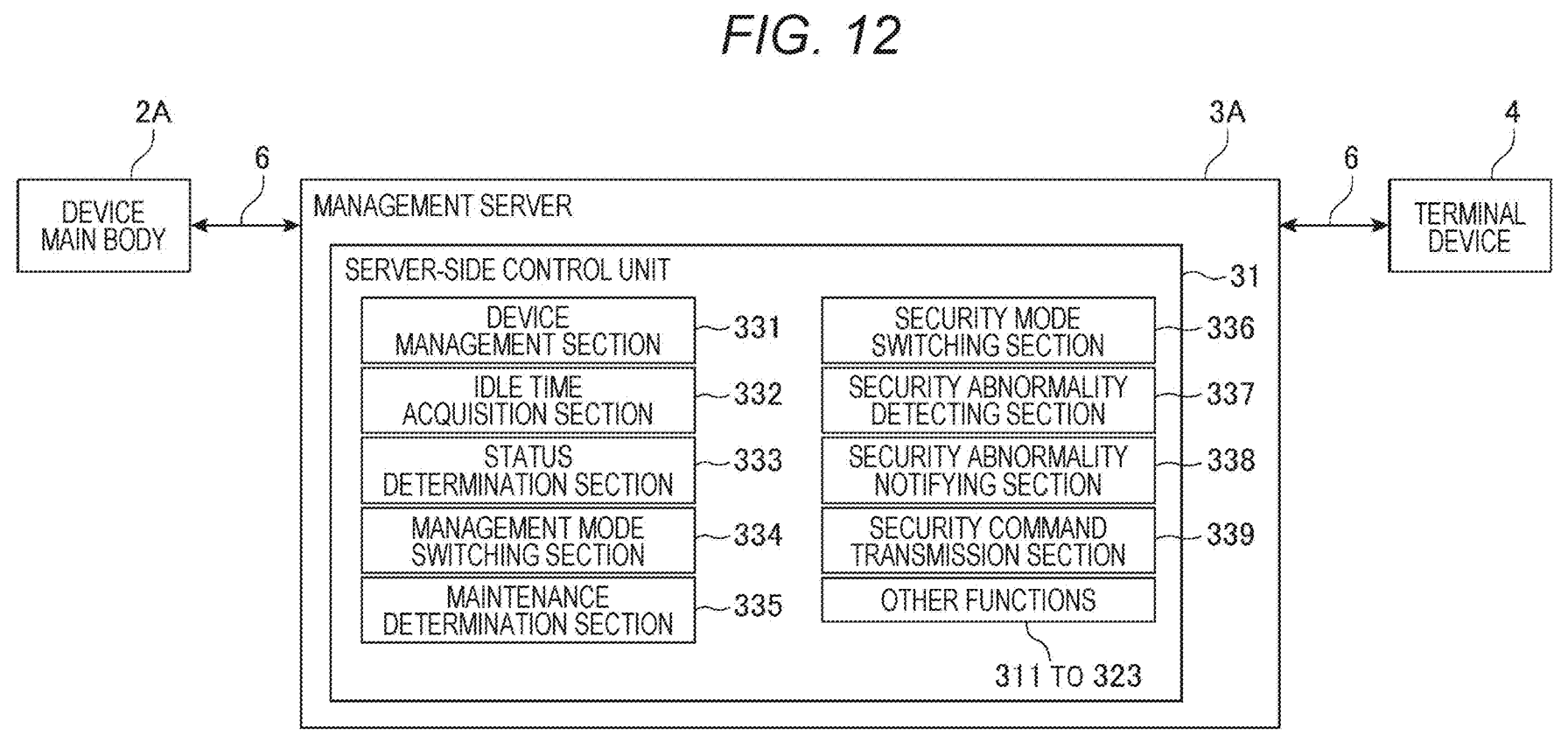

TERMINAL DEVICE 4

DEVICE MAIN BODY 2A

6

6

3A

MANAGEMENT SERVER

SERVER-SIDE CONTROL UNIT 31

DEVICE MANAGEMENT SECTION 331

IDLE TIME ACQUISITION SECTION 332

STATUS DETERMINATION SECTION 333

MANAGEMENT MODE SWITCHING SECTION 334

MAINTENANCE DETERMINATION SECTION 335

SECURITY MODE SWITCHING SECTION 336

SECURITY ABNORMALITY DETECTING SECTION 337

SECURITY ABNORMALITY NOTIFYING SECTION 338

SECURITY COMMAND TRANSMISSION SECTION 339

OTHER FUNCTIONS 311 TO 323

*FIG. 16*

MANAGEMENT SYSTEM FOR UNMANNED MOBILE SERVICE EQUIPMENT

RELATED APPLICATIONS

The present application is a continuation of International Patent Application No. PCT/JP2022/017361, filed Apr. 8, 2022, which is hereby incorporated by reference in its entirety.

TECHNICAL FIELD

This disclosure relates to a management system for an unmanned mobile service device.

BACKGROUND

A management system for a store main body typically includes a store main body including a housing unit that houses merchandise such as articles and devices that perform services, and a moving unit that moves the store main body, and a management server that manages the store main body.

In one example, a scheduling device may create a schedule of stop-by points of a store main body such as a moving store of a financial institution, a moving stall of a food and drink industry, and a moving library of a public institution. In this example, a vehicle such as a bus, a truck, or a small special vehicle is adopted as a store main body, and a driver of the vehicle goes around a plurality of stop-by points based on a schedule created by the scheduling device.

Meanwhile, in recent years, research and development has been progressing on a moving body capable of moving to a predetermined place in an unmanned manner, such as a self-driving vehicle, a drone. When such a moving body is adopted as a store main body, it is thought that the store main body is capable of moving to a predetermined place in an unmanned manner and this leads to enabling a reduction in labor costs and the improvement of efficiency of sales.

However, a conventional store main body receives a user of a financial institution, a user of a restaurant, a user of a library, or the like in the store and provides a service, and when such a moving body is adopted as the store main body, there is a problem that although the store main body is capable of moving to a predetermined place in an unmanned manner, the store main body is not capable of actively providing a service to the user.

SUMMARY

An object of the present invention is to provide a management system for an unmanned mobile service device capable of moving to a predetermined place in an unmanned manner and capable of actively providing a service to a user.

A management system for an unmanned mobile service device according to the present invention including: a service device that performs a service; a management server that is connected to the service device via a communication line and manages the service device; and a subscriber input unit that is connected to the management server via the communication line and accepts an operation input by a subscriber, in the management system, the service device includes a service performing unit that performs a service without internally accepting a user, a moving unit that moves the service device; and a device-side control unit that controls the service device, the management server includes a server-side control unit that controls the management server, and the server-side control unit includes a reservation information setting section that accepts a reservation of the service device via a subscriber input unit to store reservation information regarding a reserved place in a storage section and sets the reservation information, and a movement control section that causes the moving unit to move the service device to the reserved place based on the reservation information.

According to such a configuration, the service device includes a service performing unit that performs a service without internally accepting a user. In addition, the management server includes a reservation information setting section that stores reservation information related to the reserved place in the storage section and sets the reservation information, and a movement control section that causes the moving unit to move the service device to the reserved place based on the reservation information set by the reservation information setting section. Therefore, the service device can move to a predetermined place in an unmanned manner, and possible to actively provide a service to the user. In addition, the subscriber can receive the service provided by the service performing unit of the service device by going to the reserved place or waiting at the reserved place. Here, the service performing unit only has to be any unit as long as the service performing unit performs the service without internally accepting the user, and for example, various services such as launching of a firework, showing of a movie or the like by projection mapping, production by flight of a drone, production by operation of a robot, performance of music by an acoustic device, and provision of a scent by a device that generates a scent can be adopted. Note that the service performing unit may include a storage chamber that stores various devices, and deploy the various devices to the outside from the storage chamber to perform the service. In addition, the service performing unit may be capable of performing a plurality of types of services. In this case, the service performing unit may be able to provide a combination of a plurality of types of services, or may be able to switch the type of service according to a request of the user.

Here, the service performing unit may perform a service outdoors or may perform a service indoors. When the service is performed indoors, the moving unit may have a function necessary for the movement to the room such as opening and closing of the door and locking and unlocking of the mechanical lock in order to move the service device to the room, which is the reserved place.

In the present invention, the service performing unit preferably performs the service by accepting identification information issued from the management server to the subscriber input unit.

According to such a configuration, since the service performing unit performs the service by accepting the identification information issued from the management server to the subscriber input unit, the service can be performed when the identification information is accepted from the user, and the user can cause the service performing unit to perform the service at a desired timing.

In the present invention, the service performing unit preferably performs the service by accepting an operation input transmitted from the subscriber input unit.

According to such a configuration, since the service performing unit performs the service by accepting the operation input transmitted from the subscriber input unit, the user can operate the subscriber input unit to cause the service performing unit to perform the service. Therefore, the management system for an unmanned mobile service device can improve the convenience of the user.

In the present invention, the subscriber input unit includes a reservation-side display unit that displays information, and a reservation-side input unit that accepts an operation input, and the server-side control unit includes a server-side display control section that causes the reservation side display unit to display availability of the service device and time necessary for the reserved place based on the reservation information.

According to such a configuration, the server-side display control section causes the reservation-side display unit to display the availability of the service device and the time necessary for the reserved place based on the reservation information, and thus the user can confirm the availability of the service device and the time necessary for the reserved place. Therefore, the management system for an unmanned mobile service device can improve the convenience of the user.

In the present invention, the movement control section preferably applies for permission to the subscriber when the service device is caused to move in the movable area by obtaining the permission of the subscriber.

According to such a configuration, since the movement control section applies permission to the subscriber when the service device is caused to move in the movable area by obtaining the permission of the subscriber, for example, when the service device is caused to move an unmovable area such as a room locked by an electronic lock, the movement control section can apply to the subscriber for acquisition (permission) of an authentication key for locking/unlocking the electronic lock, and the subscriber can enter the room by unlocking the electronic lock. Note that the function of applying for permission to the subscriber may be formed to apply for permission in advance, or may be formed to have the service device standing by near the area and inform the subscriber of arrival of the service device to apply for permission.

In the present invention, preferably, the reservation information setting section stores reservation information related to a reservation date and time in the storage section, and the movement control section causes the moving unit to move the service device to the reserved place on the reservation date and time based on the reservation information.

According to such a configuration, since the movement control section causes the moving unit to move the service device to the reserved place on the reservation date and time based on the reservation information, the service device can move to a predetermined place at a predetermined time in an unmanned manner, and possible to actively provide a service to the user. In addition, the subscriber is possible to receive the service provided by the service performing unit of the service device by going to the reserved place on the reservation date and time or waiting at the reserved place.

In the present invention, preferably, the server-side control unit includes a movement status notifying section that notifies the subscriber of the movement status of the service device.

According to such a configuration, since the server-side control unit includes the movement status notifying section that notifies the subscriber of the movement status of the service device, the subscriber can easily grasp the movement status of the service device, and possible to confirm a current position of the service device, a predicted arrival time to the reserved place, and the like.

According to the present invention, the reservation information setting section stores reservation information about a subscriber in a storage section, and the device-side control unit includes a subscriber determination section that determines whether a person is a subscriber based on the reservation information, and a provision setting section that causes the service performing unit to perform a service when the subscriber determination section determines that the person is the subscriber.

According to such a configuration, the device-side control unit includes the subscriber determination section that determines whether a person is a subscriber based on the reservation information, and the provision setting section that causes the service performing unit to perform a service when the subscriber determination section determines that the person is a subscriber. Therefore, the subscriber can receive the service performed by the service performing unit of the service device after the subscriber determination section determines whether the person is a subscriber.

In the present invention, the service device includes a device-side display unit that displays information, and a device-side input unit that accepts an operation input, and the device-side control unit includes a device-side display control section that causes the device-side display unit to display a provision amount of a service performed by a service performing unit; and a device-side payment acceptance section that accepts payment according to the provision amount of the service performed by the service performing unit via the device-side input unit.

According to such a configuration, since the device-side control unit includes the device-side display control section that causes the device-side display unit to display the provision amount of the service performed by the service performing unit, and the device-side payment acceptance section that accepts payment according to the provision amount of the service performed by the service performing unit via the device-side input unit, the subscriber can execute payment according to the provision amount of the service performed by the service performing unit via the device-side input unit.

Note that, when there is a plurality of types of services that can be performed by the service performing unit, the device-side display control section may cause the device-side display unit to display the provision amount of the service for each type of service, and the device-side payment acceptance section may be able to perform payment for each type of service.

In the present invention, preferably, the subscriber input unit includes a reservation-side display unit that displays information, and a reservation-side input unit that accepts an operation input, and the server-side control unit includes a server-side display control section that causes a reservation-side display unit to display a provision amount of a service provided by a service performing unit; and a server-side payment acceptance section that accepts payment according to the provision amount of the service performed by the service performing unit via the reservation side input unit.

According to such a configuration, since the server-side control unit includes the server-side display control section that causes the reservation-side display unit to display the provision amount of the service performed by the service performing unit, and the server-side payment acceptance section that accepts payment according to the provision amount of the service performed by the service performing unit via the reservation-side input unit, the subscriber can execute payment according to the provision amount of the service performed by the service performing unit via the reservation-side input unit.

Note that, when there is a plurality of types of services that can be performed by the service performing unit, the server-side display control section may cause the reservation side display unit to display the provision amount of the service for each type of service, and the server-side payment acceptance section may be able to perform payment for each type of service.

In the present invention, the device-side control unit preferably includes a provision determination section that determines whether the service performing unit is caused to perform a service.

According to such a configuration, since the device-side control unit includes the provision determination section that determines whether the service performing unit is caused to perform the service, for example, it is determined whether the service performing unit is caused to perform the service at the reservation end time, and when it is determined that the service performing unit is caused to perform the service, it is possible to automatically end the service.

In the present invention, the server-side control unit preferably includes a place securing execution section that secures a reserved place based on the reservation information.

According to such a configuration, since the server-side control unit includes the place securing execution section that executes securing of the reserved place based on the reservation information, for example, even when a parking lot or the like is used as the reserved place, the server-side control unit can automatically secure the reserved place and pay the parking fee.

In the present invention, the device-side control unit includes an energy determination section that determines whether energy of the service device is insufficient, and an energy replenishment execution section that executes energy replenishment of the service device when the energy determination section determines that the energy is insufficient.

According to such a configuration, since the device-side control unit includes the energy determination section that determines whether the energy of the service device is insufficient and the energy replenishment execution section that executes the energy replenishment of the service device when the energy determination section determines that the energy is insufficient, it is possible to automatically execute the energy replenishment of the service device.

In the present invention, the energy replenishment execution section preferably receives energy supply from another service device and executes energy replenishment of the service device.

According to such a configuration, since the energy replenishment execution section receives energy supply from another service device and executes the energy replenishment of the service device, the energy replenishment execution section can receive energy supply from another service device moving near the energy replenishment execution section without moving to a predetermined place.

In the present invention, the subscriber input unit includes a reservation-side display unit that displays information, and the server-side control unit includes a server-side display control section that causes the reservation side display unit to display the service performed by the service performing unit.

According to such a configuration, since the server-side control unit includes the server-side display control section that causes the reservation side display unit to display the service to be performed by the service performing unit, the subscriber can confirm the service to be performed by the service performing unit of the service device before reservation.

The present invention preferably includes a first service device and a second service device different from the first service device, the reservation information setting section stores, in the storage section, reservation information related to a service desired by a subscriber, the server-side control unit includes a service device selection section that selects at least one of the first service device and the second service device as a service device including a service desired by the subscriber based on reservation information, and the movement control section causes the moving unit to move the service device selected by the service device selection section to the reserved place based on the reservation information.

According to such a configuration, the server-side control unit includes the service device selection section that selects at least one of the first service device and the second service device as the service device including the service desired by the subscriber based on the reservation information, and the movement control section causes the moving unit to move the service device selected by the service device selection section to the reserved place based on the reservation information. Therefore, the subscriber can reliably receive the provision of the service performed by the service performing unit of the service device by going to the reserved place or waiting at the reserved place.

In the present invention, preferably, the device-side control unit includes an abnormality informing section that informs a management server of an abnormality of a service device via a communication line when an abnormality occurring in the service device is detected, and the server-side control unit includes an abnormality notifying section that notifies an administrator of the abnormality of the service device when the abnormality informing section informs the abnormality of the service device.

According to such a configuration, since the server-side control unit includes the abnormality notifying section that notifies the administrator of the abnormality of the service device when the abnormality informing section informs the abnormality of the service device, the administrator can easily grasp the abnormality such as damage of the service device or unauthorized use of the service device even in the unmanned mobile service device capable of moving to a predetermined place in an unmanned manner and capable of actively providing the service to the user.

Here, the abnormality informing section may detect an abnormality occurring in the service device not only in a status in which the service is being performed but also in various statuses such as a status in which the service is not being performed and a status in which the service device is moving.

In addition, the abnormality notifying section not only notifies the administrator of the abnormality of the service device, but also may notify an engineer who repairs the service device or a repair robot of the abnormality of the service device to request service, or may notify a security guard or a security robot who protects the service device of the abnormality of the service device to request service.

In the present invention, the device-side control unit preferably includes a normal service provision determination section that determines whether the service performing unit is normally performing a service, and detects an abnormality occurring in the service device when it is determined that the service performing unit is not normally performing the service.

According to such a configuration, since the device-side control unit includes the normal service provision determination section that determines whether the service performing unit is normally performing the service, and detects the abnormality occurring in the service device when determining that the service performing unit is not normally performing the service, for example, unlike the subscriber who can normally receive the provision of the service performed by the service performing unit of the service device, i.e., the subscriber permitted by the administrator, the normal service provision determination section can detect the use of the service by the user using the unauthorized unit as the abnormality, and it is possible to improve the safety of the service device.

In the present invention, preferably, a service device includes a customer service unit that serves a subscriber, and the device-side control unit includes a customer service execution section that executes customer service by the customer service unit when the normal service provision determination section determines that the service performing unit is normally performing the service.

According to such a configuration, since the device-side control unit includes the customer service execution section that executes customer service by a customer service unit when the normal service provision determination section determines that the service performing unit is normally performing the service, the device-side control unit can execute the customer service by the customer service unit for the subscriber who can normally receive the service provision, i.e., the subscriber permitted by the administrator. Here, as the content of the customer service by the customer service unit, for example, explaining a service sales point to the subscriber can be adopted. In addition, as the content of the customer service by the customer service unit, for example, a service preferred by the subscriber may be determined based on information such as a past use history of the subscriber, and the service preferred by the subscriber may be recommended.

In the present invention, a service device includes an imaging unit that captures an image, the device-side control unit includes a behavior pattern storage section that stores a sample of a normal behavior pattern of a subscriber, a behavior pattern acquisition section that acquires a behavior pattern of the subscriber based on an image captured by the imaging unit, and a behavior pattern determination section that compares the sample of the behavior pattern stored in the behavior pattern storage section with the behavior pattern acquired by the behavior pattern acquisition section to determine whether the sample of the behavior pattern is different from the behavior pattern acquired by the behavior pattern acquisition section, and detects an abnormality occurring in the service device when it is determined that the sample of the behavior pattern is different from the behavior pattern acquired by the behavior pattern acquisition section.

According to such a configuration, since the device-side control unit includes the behavior pattern determination section that compares the sample of the normal behavior pattern of the subscriber of the service device with the behavior pattern acquired by the behavior pattern acquisition section to determine whether the sample of the behavior pattern is different from the behavior pattern acquired by the behavior pattern acquisition section, and detects the abnormality occurring in the service device when determining that the sample of the behavior pattern is different from the behavior pattern acquired by the behavior pattern acquisition section, for example, by storing a behavior pattern suitable for an ordinary subscriber such as operating the service device in the behavior pattern storage section as the normal behavior pattern, an intruder with a suspicious behavior pattern such as disassembling the service device can be detected as an abnormality by the behavior pattern determination section, and it is possible to improve the safety of the service device.

In the present invention, preferably, a service device includes an imaging unit that captures an image, the device-side control unit includes a behavior pattern storage section that stores a sample of an abnormal behavior pattern of a subscriber, a behavior pattern acquisition section that acquires a behavior pattern of a subscriber based on an image captured by an imaging unit, and a behavior pattern determination section that compares the sample of the behavior pattern stored in the behavior pattern storage section with the behavior pattern acquired by the behavior pattern acquisition section to determine whether the sample of the abnormal behavior pattern matches the behavior pattern acquired by the behavior pattern acquisition section, and detects an abnormality occurring in the service device when it is determined that the samples match.

According to such a configuration, since the device-side control unit includes the behavior pattern determination section that compares the sample of the abnormal behavior pattern of the subscriber of the service device with the behavior pattern acquired by the behavior pattern acquisition section to determine whether the sample of the abnormal behavior pattern matches the behavior pattern acquired by the behavior pattern acquisition section, and detects the abnormality occurring in the service device when the sample of the abnormal behavior pattern matches the behavior pattern acquired by the behavior pattern acquisition section, for example, by storing a behavior suspicious behavior pattern such as disassembling the service device in the behavior pattern storage section as the abnormal behavior pattern, an intruder with the behavior suspicious behavior pattern can be detected as an abnormality by the behavior pattern determination section, and it is possible to improve the safety of the service device.

In the present invention, preferably, the server-side control unit includes a reservation management section that manages reservation information including a reservation start time and a reservation end time, a command creation section that creates a command for a service device, and a command transmission section that transmits the command to a service device via a communication line, and the device-side control unit includes a command receiving section that receives the command from the command transmission section, and a command execution section that executes a predetermined operation based on the command received by the command receiving section.

According to such a configuration, since the device-side control unit includes the command receiving section that receives the command from the command transmission section and the command execution section that executes the predetermined operation based on the command received by the command receiving section, it is possible to approach the subscriber who uses the service device by executing the operation based on an appropriate command. Therefore, for example, the device-side control unit can suppress the time excess by notifying the subscriber of the reservation end time, set the idle time until the next subscriber makes a reservation to be short, and increase the utilization rate of the service device.

In the present invention, preferably, the command creation section creates, based on the reservation information, an end command that causes the service performing unit to end the provision of the service when the reservation end time comes, and the command execution section causes the service performing unit to end the provision of the service based on the end command.

According to such a configuration, since the command execution section causes the service performing unit to end the provision of the service based on the end command, the service device can automatically end the provision of the service when the reservation termination time comes.

In the present invention, preferably, the command creation section creates a notification command that notifies reservation end time based on the reservation information, and the command execution section notifies a subscriber of the reservation end time based on the notification command.

According to such a configuration, since the command execution section notifies the subscriber of the reservation end time based on the notification command, the device-side control unit notifies the subscriber of the reservation end time, and thus, it is possible to suppress the time excess, to set the idle time the next subscriber makes a reservation to be short, and to increase the utilization rate of the service device.

In the present invention, preferably, the reservation management section manages reservation information including a reservation status after a reservation end time, and the command creation section creates an extension command that notifies whether the reserved time can be extended according to the reservation status based on the reservation information, and the command execution section notifies the subscriber of whether the reserved time can be extended based on the extension command.

According to such a configuration, since the command execution section notifies the subscriber of whether the extension is possible based on the extension command, when the service device has idle time after the reservation end time, the command execution section can notify the subscriber that the extension is possible. In addition, when there is no idle time of the service device after the reservation end time, it is possible to notify the subscriber that the extension is impossible.

In the present invention, preferably, the service device includes an extension acceptance unit that accepts an input of an extension application by a subscriber, the device-side control unit includes an application transmission section that transmits an extension application to a management server via a communication line when an extension receiving section receives an input of the extension application, the server-side control unit includes an application receiving section that receives the extension application transmitted from the application transmission section, and the reservation management section updates the reservation information by changing the reservation end time based on the extension application received by the application receiving section.

According to such a configuration, since the server-side control unit includes the application receiving section that receives the extension application transmitted from the application transmission section, and the reservation management section changes the reservation end time and updates the reservation information based on the extension application received by the application receiving section, it is possible to execute the extension processing based on the extension application of the subscriber.

The present invention preferably includes a maintenance device that performs maintenance of a service device, the server-side control unit includes a reservation management section that manages reservation information including a reservation start time and a reservation end time, an idle time acquisition section that acquires idle time of a service device based on reservation information, a status determination section that determines whether time is idle time of the service device based on an acquisition result of the idle time acquisition section, and a management mode switching section that switches a management mode of the service device from a normal mode to a maintenance mode in which maintenance of the service device is executed by the maintenance device when the status determination section determines that the time is idle time of the service device.

According to such a configuration, since the server-side control unit includes the idle time acquisition section that acquires idle time of the service device based on reservation information, the status determination section that determines whether the idle time of the service device is present based on an acquisition result of the idle time acquisition section, and the management mode switching section that switches the management mode of the service device from the normal mode to the maintenance mode in which maintenance of the service device is executed by the maintenance device when the status determination section determines that the idle time of the service device is present, it is possible to execute maintenance of the service device before a reservation start time of the next subscriber. Therefore, it is possible to cause the maintenance device to execute the maintenance by efficiently using the idle time of the service device, to reduce the manual maintenance work, and to suppress the operation cost of the management system for an unmanned mobile service device.

In the present invention, preferably, the server-side control unit includes a device management section that manages necessary time for execution of maintenance by a maintenance device, a maintenance determination section that determines whether maintenance is feasible based on the idle time acquired by the idle time acquisition section and a necessary time of the maintenance device when the management mode switching section switches to the maintenance mode, and the device management section causes the maintenance device to perform maintenance when the maintenance determination section determines that maintenance is feasible.

According to such a configuration, the server-side control unit includes the maintenance determination section that determines whether the maintenance is feasible based on the idle time acquired by the idle time acquisition section and the necessary time of the maintenance device when the management mode switching section switches to the maintenance mode, and the device management section causes the maintenance device to execute the maintenance when the maintenance determination section determines that the maintenance is feasible, and thus the management system for an unmanned mobile service device can reliably end the maintenance before the reservation start time of the next subscriber.

The present invention preferably includes a detection unit that detects presence or absence of a moving body near a service device, the status determination section determines, based on a detection result of the detection unit and an acquisition result of the idle time acquisition section, whether time is an idle time of the service device and the service device is in an unused status where there is no moving object near the service device, and the management mode switching section switches the management mode of the service device from the normal mode to the maintenance mode when the status determination section determines that the service device is in the unused status.

According to such a configuration, since the status determination section determines, based on the detection result of the detection unit and the acquisition result of the idle time acquisition section, whether time is an idle time of the service device and the service device is in an unused status where there is no moving body near the service device, and the management mode switching section switches the management mode of the service device from the normal mode to the maintenance mode when the status determination section determines that the service device is in the unused status, it is possible to execute maintenance of the service device before the reservation start time of the next subscriber after confirming that the service device is in the unused status in which there is no moving body near the service device. Therefore, it is possible to cause the maintenance device to execute the maintenance by efficiently using the idle time of the service device, to reduce the manual maintenance work, and to suppress the operation cost of the management system for an unmanned mobile service device.

In the present invention, preferably, the server-side control unit includes a security mode switching section that switches a security mode from a normal mode to a security mode that executes security of the service device when the status determination section determines that the service device is in the unused status.

According to such a configuration, since the server-side control unit includes the security mode switching section that switches the security mode from the normal mode to the security mode that executes the security of the service device when the status determination section determines that the service device is in the unused status, the server-side control unit can execute the security of the service device before the reservation start time of the next subscriber.

In the present invention, preferably, the server-side control unit includes a security abnormality detection section that detects an abnormality of the service device based on a detection result of the detection unit when the security mode is switched by the security mode switching section, and a security abnormality notifying section that notifies an administrator of the abnormality of the service device when the security abnormality detection section detects the abnormality of the service device.

According to such a configuration, since the server-side control unit includes the security abnormality detection section that detects an abnormality of the service device based on the detection result of the detection unit when the security mode switching section switches to the security mode, and the security abnormality notifying section that notifies the administrator of the abnormality of the service device when the security abnormality detection section detects the abnormality of the service device, the administrator can easily grasp the abnormality of the service device.

In the present invention, preferably, the security abnormality detection section does not detect an operation of the maintenance device as an abnormality of the service device.

According to such a configuration, since the security abnormality detection section does not detect the operation of the maintenance device as an abnormality of the service device, the server-side control unit can cause the maintenance device to execute maintenance even when the security mode switching section switches to the security mode.

In the present invention, preferably, the server-side control unit includes a security command transmission section that transmits a command for executing security of a service device to an external security system via a communication line when the security mode is switched by the security mode switching section.

According to such a configuration, since the server-side control unit includes the security command transmission section that transmits a command for executing security of the service device to the external security system via the communication line when the security mode is switched by the security mode switching section, the service device does not have to include a device that executes security of the service device, it is possible to simplify the configuration of the service device and to further suppress the operation cost of the management system for the unmanned mobile service device.

In the present invention, preferably, the service device includes a booth provided with a service performing unit, a carrier provided with a moving unit that moves the booth, and the device-side control unit includes a booth-side control unit that controls the booth, and a carrier-side control unit that controls the carrier, and the booth and the carrier are detachably formed.

According to such a configuration, since the service device includes the booth including the service performing unit and the carrier including the moving unit that moves the booth, and the booth and the carrier are detachably formed, it is possible to freely move the carrier independently by moving the service device to the reserved place by the movement control section based on the reservation information, and then separating the booth and the carrier from each other. Therefore, the management system for an unmanned mobile service device can efficiently operate by individually controlling the booth and the carrier.

In the present invention, preferably, the service device includes at least one booth, and a plurality of carriers, and each of the booth and the carrier is detachably formed.

According to such a configuration, since the service device includes at least one booth and a plurality of carriers, and each of the booth and the carrier is detachably formed, for example, after the booth is moved to a reserved place on a certain carrier, the booth can be collected by another carrier. Therefore, the management system for an unmanned mobile service device can efficiently operate by individually controlling the booth and the carrier.

In the present invention, preferably, the server-side control unit includes a separation control section that separates the booth and the carrier after the movement control section moves the service device to a reserved place on the moving unit based on reservation information, so that the carrier is allowed to freely move independently, and a collection control section that collects the booth by coupling the booth to the carrier after moving the carrier to a place where the booth is present based on establishment of a predetermined condition.

According to such a configuration, since the server-side control unit includes the collection control section that collects the booth by moving the carrier to the place where the booth is present based on the establishment of the predetermined condition and coupling the booth to the carrier, for example, it is possible to cause the carrier to collect the booth under a predetermined condition that the use of the service by the subscriber has ended. Therefore, the management system for an unmanned mobile service device can efficiently operate by individually controlling the booth and the carrier.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 12 is a schematic configuration diagram showing functions of a management server.

FIG. 16 is a schematic configuration diagram showing functions of a management server.

DETAILED DESCRIPTION

Hereinafter, implementations of the present disclosure will be described with reference to the drawings.

First Embodiment

In the following, a first embodiment of the present invention will be described with reference to the drawings.

Figure 1:
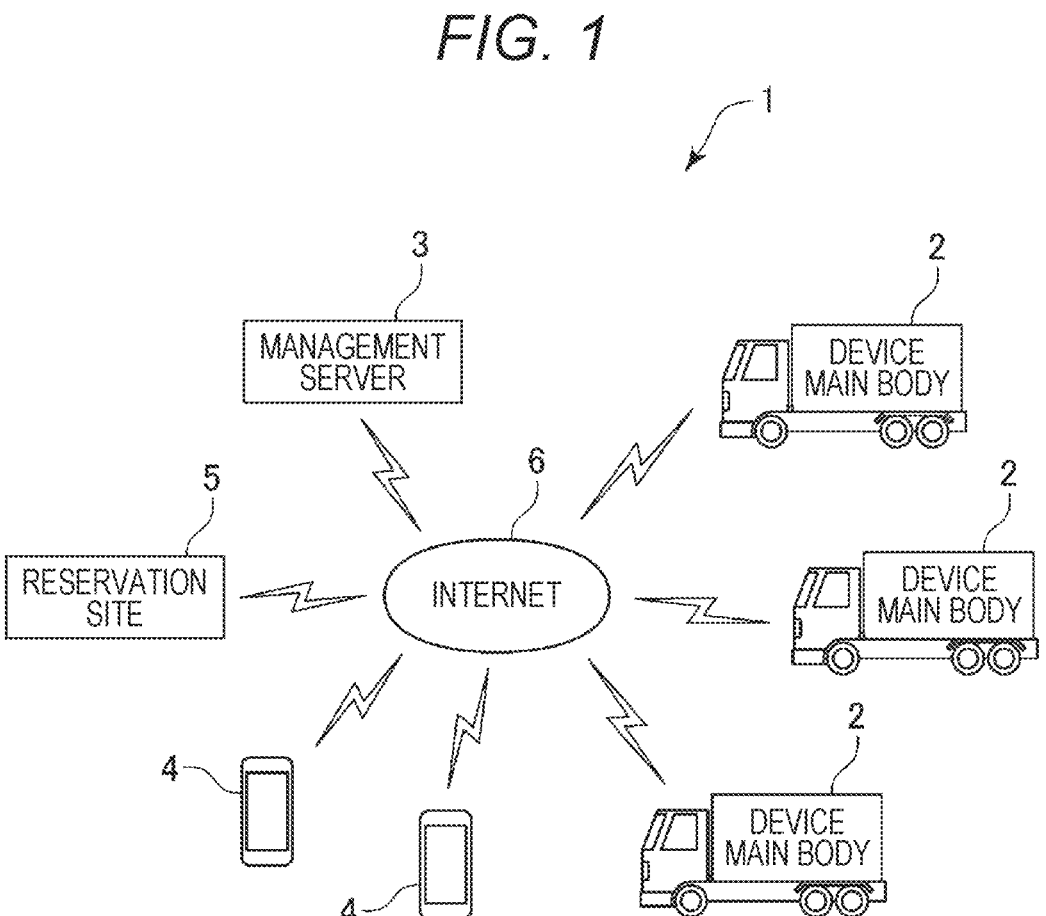
FIG. 1 is a schematic configuration diagram of a management system for an unmanned mobile service device according to a first embodiment of the present invention.

FIG. 1 is a schematic configuration diagram of a management system for an unmanned mobile service device according to the first embodiment of the present invention.

As shown in FIG. 1, a management system 1 for an unmanned mobile service device includes a device main body 2 as a service device for performing a service, a management server 3 that manages the device main body 2, a terminal device 4 such as a mobile phone, a smartphone, or a personal computer possessed by a subscriber who wishes to reserve the device main body 2, and a reservation site 5 that reserves the device main body 2. The device main body 2, the management server 3, the terminal device 4, and the reservation site 5 are connected to each other in a manner that communications are feasible via the Internet 6, which is a public network as a communication line.

The subscriber can access the management server 3 or the reservation site 5 via the Internet 6 using the terminal device

4, specify the use time, and reserve the device main body 2. When accepting the reservation from the subscriber, the reservation site 5 transmits reservation information regarding the subscriber, a reservation date and time, and a reserved place to the management server 3.

Figure 2:
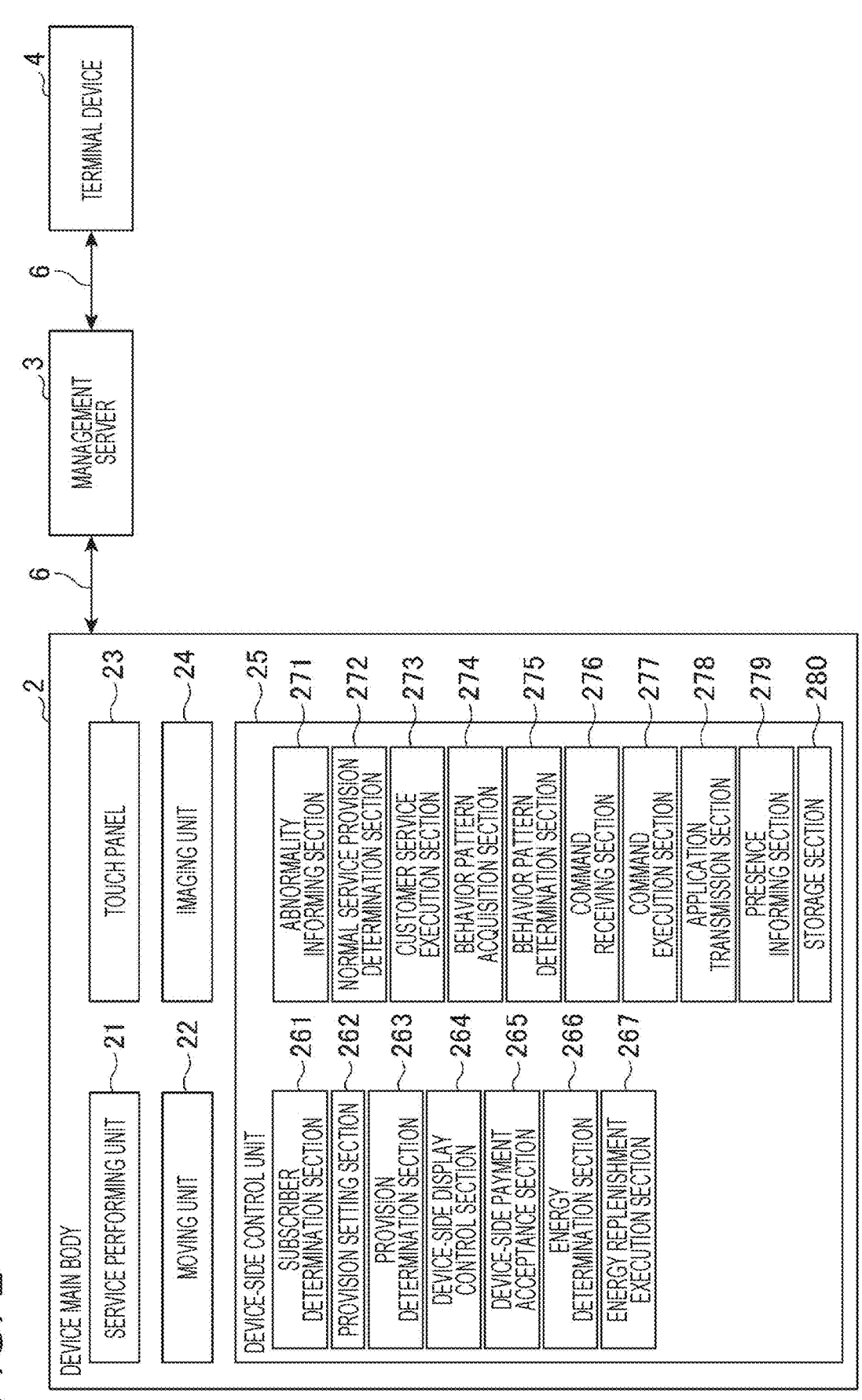
FIG. 2 is a schematic configuration diagram showing functions of a device main body.

FIG. 2 is a schematic configuration diagram showing functions of the device main body.

As shown in FIG. 2, the device main body 2 includes a service performing unit 21 that performs a service without internally accepting a user, a moving unit 22 that moves the device main body 2, a touch panel 23 that displays information and accepts an operation input, an imaging unit 24 that captures an image of the vicinity of the device main body 2, and a device-side control unit 25 that controls the device main body 2.

The service performing unit 21 performs service provision by receiving a personal identification number issued from the management server 3 to the terminal device 4 of the subscriber, and an authentication key including an optical code such as a barcode and a QR code (registered trademark). The authentication key is randomly changed each time of use, and a subscriber who has made a reservation at that time can receive a service by using a unique authentication key. Here, the service performing unit 21 may be any unit as long as the service performing unit 21 performs the service without accepting the user inside, and for example, various services such as launching of a firework, showing of a movie or the like by projection mapping, production by flight of a drone, production by operation of a robot, performance of music by a sound device, and provision of a scent by a device that generates a scent can be adopted.

Note that in the present embodiment, the authentication key adopts a personal identification number, an optical code such as a bar code and a QR code (registered trademark), or the like; however, for example, biometric authentication such as face authentication, fingerprint authentication, or retina authentication may be adopted, and any authentication may be adopted as long as the subscriber can be authenticated.

In addition, in the present embodiment, the service performing unit 21 can provide a service by receiving an authentication key (identification information) issued from the management server 3 to the terminal device 4 of the subscriber. The authentication key may be configured to be transmitted from the management server to the subscriber input unit, or may be configured to be browsable by operating a subscriber input unit. In addition, the service performing unit may be able to provide a service, for example, by accepting an operation input transmitted from the subscriber input unit.

Any moving unit 22 may be adopted as long as the device main body 2 can be moved to a reserved place in an unmanned manner. For example, the moving unit 22 may adopt a self-driving vehicle, a drone, or the like.

The touch panel 23 accepts an input of information in accordance with an operation of a subscriber, and provides the subscriber with predetermined information in an image. In other words, the touch panel 23 functions as a device-side display unit and a device-side input unit.

Note that in the present embodiment, the device-side display unit and the device-side input unit are integrally mounted on the device main body 2 by the touch panel 23, but may be individually mounted, and a display device or an input device different from the touch panel 23 may be adopted. In short, the device-side display unit only has to be able to display information, and the device-side input unit only has to be able to accept an operation input. In addition, the device-side display unit may transmit information to a subscriber using voice, hologram, virtual reality (VR), augmented reality (AR), or the like instead of the function of displaying information, and the device-side input unit may accept input of information from the subscriber using voice, hologram, virtual reality (VR), augmented reality (AR), or the like instead of the function of receiving operation input.

The imaging unit 24 mainly captures images of the device main body 2 and its periphery (vicinity). In addition, the imaging unit 24 detects the presence of a subscriber (human). As the imaging unit 24, for example, a charge coupled device (CCD) camera or the like can be adopted. Note that, in the present embodiment, the imaging unit 24 is adopted to detect the presence of a subscriber, but light detection and ranging (LiDAR), novel view synthesis, a human sensor, or the like may be adopted.

The device-side control unit 25 includes a central processing unit (CPU), a memory, and the like, and executes information processing according to a predetermined program stored in the memory. The device-side control unit 25 includes a subscriber determination section 261, a provision setting section 262, a provision determination section 263, a device-side display control section 264, a device-side payment acceptance section 265, an energy determination section 266, and an energy replenishment execution section 267. Further, the device-side control unit 25 includes an abnormality informing section 271, a normal service provision determination section 272, a customer service execution section 273, a behavior pattern acquisition section 274, a behavior pattern determination section 275, a command receiving section 276, a command execution section 277, an application transmission section 278, a presence informing section 279, and a storage section 280.

The subscriber determination section 261 determines whether a person is the subscriber based on the reservation information described above. Specifically, the subscriber determination section 261 determines that the person is the subscriber when the input of the authentication key is normally accepted via the touch panel 23, and determines that the subscriber is not the subscriber when the input of the authentication key is not normally accepted via the touch panel 23.

Note that the reservation information includes information regarding an authentication key in addition to the information regarding the subscriber, the reservation date and time, and the reserved place described above, and is stored in the storage section 280.

The device-side control unit 25 sets an authentication key corresponding to the reservation information in the service performing unit 21 at the reservation start time included in the reservation information stored in the storage section 280 or slightly before the reservation start time (for example, 10 minutes before the reservation start time). As a result, the subscriber can cause the service performing unit 21 of the device main body 2 to provide the service using the authentication key transmitted from the management server 3.

Then, when the reservation end time included in the reservation information stored in the storage section 280 has elapsed or slightly after the reservation end time (for example, 10 minutes after the reservation end time), the device-side control unit 25 sets an authentication key different from the authentication key corresponding to the reservation information in the service performing unit 21. Accordingly, the subscriber is not permitted to cause the service performing unit 21 of the device main body 2 to provide the service.

When the subscriber determination section 261 determines that a person is the subscriber, the provision setting section 262 causes the service performing unit 21 to provide the service. Specifically, for example, the provision setting section 262 causes provision of various services such as launching of a firework, showing of a movie or the like by projection mapping, production by flight of a drone, production by operation of a robot, performance of music by a sound device, and provision of a scent by a device that generates a scent.

In addition, the provision setting section 262 causes the service performing unit 21 to end the provision of the service after accepting an operation input to end the provision of the service via the touch panel 23 or when the reservation end time comes.

The provision determination section 263 determines whether the service performing unit 21 is caused to provide a service. Here, the provision determination section 263 determines whether the service performing unit 21 is caused to perform the provision of the service after accepting the operation input to end the provision of the service via the touch panel 23 or when the reservation end time comes. Specifically, the provision determination section 263 causes the imaging unit 24 to capture an image of the device main body 2 to determine whether the service performing unit 21 is caused to provide a service.

Note that, in the present embodiment, the provision determination section 263 determines whether the service performing unit 21 is caused to provide a service by causing the imaging unit 24 to capture an image of the device main body 2; however, for example, the provision determination section may determine whether the service performing unit 21 is caused to provide a service by using a sensor. In short, the provision determination section only has to be able to determine whether the service performing unit is caused to provide a service.

Further, in the present embodiment, when the provision determination section 263 determines that the service performing unit 21 is not caused to perform the provision of the service, the provision setting section 262 automatically ends the provision of the service. However, for example, the provision setting section may prompt the subscriber to end the provision of the service.

After causing the service performing unit 21 to end providing the service, the device-side display control section 264 causes the touch panel 23 to display the providing time (provision amount) of the service performed by the service performing unit 21.

The device-side payment acceptance section 265 accepts payment according to the service provision time (provision amount) performed by the service performing unit 21 via the touch panel 23.

In the present embodiment, after the service provision is automatically ended, or when the provision determination section 263 determines that the service provision is ended, the device-side control unit 25 informs the management server 3 of the operation completion of the device main body 2 via the Internet 6. After that, the device-side control unit 25 puts the device main body 2 into a standby status.

The energy determination section 266 determines whether energy (fuel, electric power, and the like) of the device main body 2 is insufficient.

The energy replenishment execution section 267 executes the energy replenishment of the device main body 2 when the energy determination section 266 determines that the energy is insufficient. In the present embodiment, the energy replenishment execution section 267 automatically executes energy replenishment by moving the device main body 2 to the moving unit 22 to a maintenance site (not shown) of the device main body 2 installed in a predetermined place and then cooperating with a robot (not shown) that replenishes energy arranged in the maintenance site. Note that the energy replenishment execution section 267 may manually execute energy replenishment by informing the operator of energy to be replenished.

Here, for example, the energy replenishment execution section may receive energy supply from another device main body and execute energy replenishment of the device main body. When the energy replenishment execution section is configured in this manner, the energy replenishment execution section receives energy supply from another device main body and executes the energy replenishment of the device main body. Therefore, the energy replenishment execution section can receive energy supply from another device main body moving near the energy replenishment execution section without moving to a predetermined place such as a maintenance site.

Note that in the present embodiment, the energy replenishment execution section 267 executes the energy replenishment by causing the moving unit 22 to move the device main body 2 to the maintenance site of the device main body 2 installed in a predetermined place, but conversely, the energy replenishment may be executed by moving the maintenance site of the device main body 2 to the device main body 2.

In the case of detecting an abnormality occurring in the device main body 2, the abnormality informing section 271 informs the management server 3 of the abnormality of the device main body 2 via the Internet 6.

The normal service provision determination section 272 determines whether the service performing unit 21 is normally performing a service, and detects an abnormality occurring in the device main body 2 when it is determined that the service performing unit is not normally performing a service.

The customer service execution section 273 executes customer service using the touch panel 23 when the normal service provision determination section 272 determines that the service performing unit 21 normally performs a service. Specifically, the customer service execution section 273 displays sales points of the service on the display screen of the touch panel 23 and starts the explanation to the subscriber.

In this manner, the touch panel 23 functions as a customer service unit that serves the subscriber.

Note that in the present embodiment, the touch panel 23 is adopted as the customer service unit. However, for example, a robot that can freely move around the device main body may be adopted to guide the subscriber to show the service, or various devices mounted on the device main body may be connected via a communication line to automatically operate the various devices. In short, any customer service unit may be adopted as long as it can serve the subscriber.

In addition, in the present embodiment, the touch panel 23 is adopted as the customer service unit, but the customer service unit may be configured using a technology different from the touch panel 23. In short, the customer service unit may transmit information to the subscriber using voice, hologram, VR, AR, or the like, or may receive input of information from the subscriber.

The behavior pattern acquisition section 274 acquires a behavior pattern of the subscriber based on the image captured by the imaging unit 24.

The behavior pattern determination section 275 compares a plurality of samples of the behavior pattern stored in the storage section 280 with the behavior pattern acquired by the behavior pattern acquisition section 274 to determine whether the plurality of samples of the behavior pattern stored in the storage section 280 are different from the behavior pattern acquired by the behavior pattern acquisition section 274, and detects an abnormality occurring in the device main body 2 when it is determined that the plurality of samples of the behavior pattern stored in the storage section 280 are different from the behavior pattern acquired by the behavior pattern acquisition section 274.

Here, the storage section 280 stores in advance a plurality of samples of normal behavior patterns of the subscriber. Specifically, for example, the storage section 280 stores, as a normal behavior pattern, a behavior pattern based on a normal reservation such as operating the device main body 2. As described above, in the present embodiment, the storage section 280 functions as a behavior pattern storage section.

Note that in the present embodiment, the storage section 280 is configured using a memory of the device-side control unit 25, but may be configured using a hard disk drive (HDD), network attached storage (NAS), or the like, or may be configured using a cloud service.

In addition, each function of the device-side control unit 25 is executed according to a program stored in the storage section 280, but may be configured using independent devices or by cloud computing.

As described above, in the present embodiment, the abnormality informing section 271 informs the management server 3 of an abnormality of the device main body 2 via the Internet 6 when the normal service provision determination section 272 detects the abnormality occurring in the device main body 2 and when the behavior pattern determination section 275 detects the abnormality occurring in the device main body 2.

On the other hand, for example, a sound collection unit such as a microphone may be used to collect sound of the device main body 2, determine whether damage or the like of the device main body 2 has occurred based on the collected sound, and detect abnormality occurring in the device main body 2 when it is determined that damage or the like of the device main body 2 has occurred. In short, the abnormality informing section only has to be able to inform the management server of the abnormality of the device main body via the communication line when the abnormality occurring in the device main body is detected.

In addition, for example, it may be determined whether a noise sensor has detected noise near the device main body, and when it is determined that the noise near the device main body has been detected, an abnormality occurring in the device main body may be detected. When a service is performed in a room, it may be determined whether an increase in the concentration of carbon dioxide near the device main body has been detected by a carbon dioxide sensor, and when the increase in the concentration of carbon dioxide near the device main body has been detected, an abnormality occurring in the device main body may be detected. In such a case (when an undesirable abnormality is detected at the time of sales operation by the device main body), the subscriber may be notified that noise near the device main body has been detected as a type of customer service by the customer service unit, or air cleaning may be automatically executed in the device main body based on the detection of the increase in the concentration of carbon dioxide near the device main body.

The command receiving section 276 receives a command from the management server 3.

The command execution section 277 executes a predetermined operation based on the command received by the command receiving section 276. This predetermined operation will be described in detail later.

The application transmission section 278 transmits, to the management server 3, an extension application for applying for extension of a reserved time by the subscriber. Specifically, in the case of receiving an extension application input from the subscriber via the touch panel 23, the application transmission section 278 transmits the extension application to the management server 3 via the Internet 6. In the present embodiment, the touch panel 23 functions as an extension acceptance unit that accepts an extension application input by a subscriber.

When the imaging unit 24 detects presence of a human such as a subscriber, a presence informing section 279 informs the management server 3 of the presence of the human such as the subscriber via the Internet 6.

Figure 3:
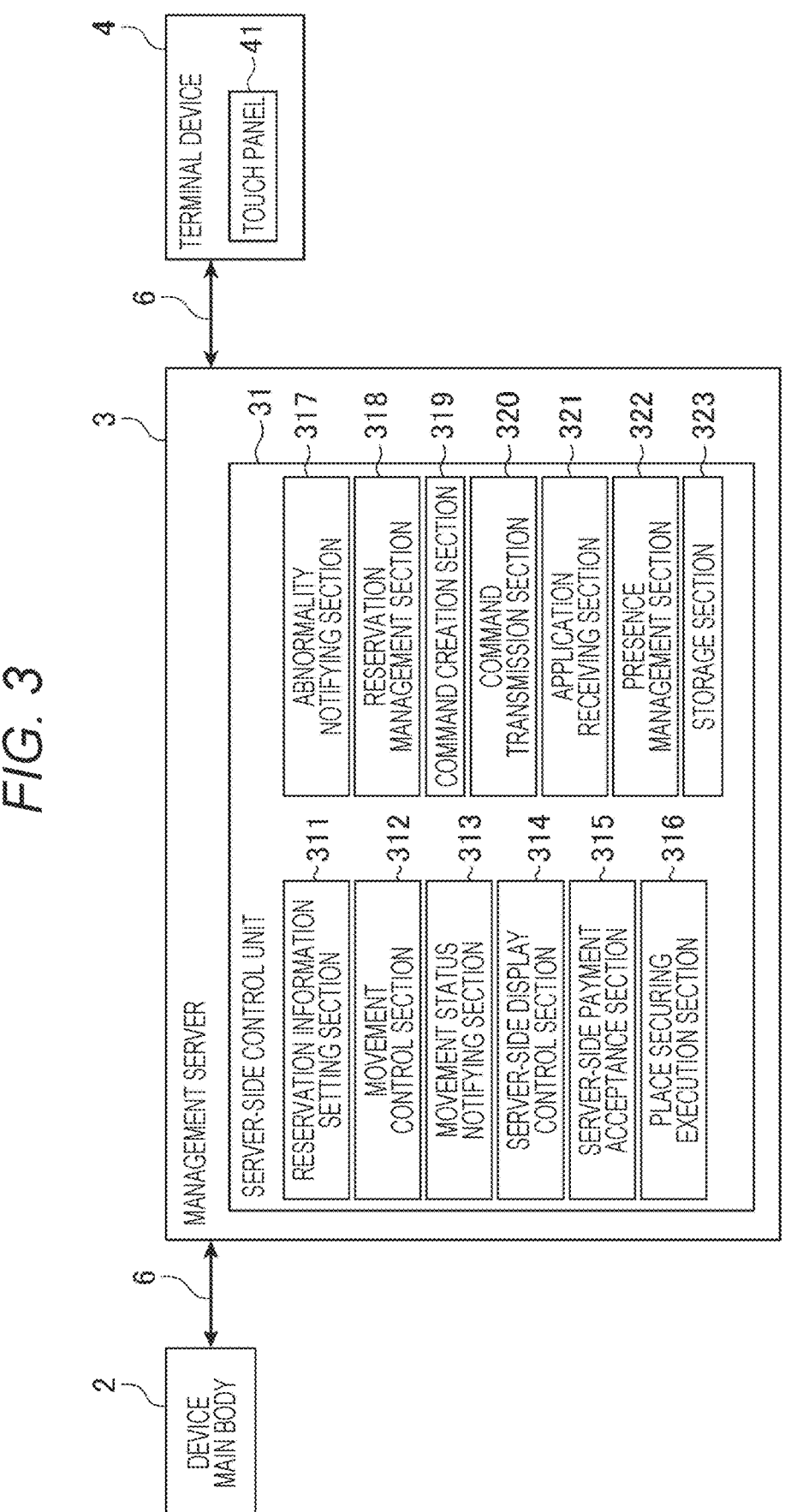
FIG. 3 is a schematic configuration diagram showing functions of a management server and a terminal device.

FIG. 3 is a schematic configuration diagram showing functions of the management server and the terminal device.

As shown in FIG. 3, the terminal device 4 includes a touch panel 41. The touch panel 41 accepts an input of information according to an operation of a subscriber and provides predetermined information to the subscriber by an image. In other words, the touch panel 41 functions as a reservation-side display unit and a reservation-side input unit.

Note that in the present embodiment, the reservation-side display unit and the reservation-side input unit are integrally mounted on the terminal device 4 by the touch panel 41, but may be individually mounted, or a display device or an input device different from the touch panel 41 may be adopted. In short, the reservation-side display unit only has to be able to display information, and the reservation-side input unit only has to be able to accept an operation input. In addition, the reservation-side display unit may transmit information to a subscriber using voice, hologram, VR, AR, or the like instead of the function of displaying information, and the reservation-side input unit may receive input of information from the subscriber using voice, hologram, VR, AR, or the like, instead of the function of receiving operation input.

The management server 3 includes a server-side control unit 31.

The server-side control unit 31 includes a CPU, a memory, and the like, and executes information processing according to a predetermined program stored in the memory. The server-side control unit 31 includes a reservation information setting section 311, a movement control section 312, a movement status notifying section 313, a server-side display control section 314, a server-side payment acceptance section 315, a place securing execution section 316, an abnormality notifying section 317, a reservation management section 318, a command creation section 319, a command transmission section 320, an application receiving section 321, a presence management section 322, and a storage section 323.

The reservation information setting section 311 receives the reservation of the device main body 2 through the terminal device 4 to store and set reservation information on a subscriber, a reserved place, and a reservation date and time (reservation start time and reservation end time) in the storage section 323.

Here, the server-side display control section 314 causes the touch panel 41 of the terminal device 4 to display a service performed by the service performing unit 21. In addition, the server-side display control section 314 displays availability of the device main body 2 and time necessary for the reserved place on the touch panel 41 of the terminal device 4 based on the reservation information.

Note that in the present embodiment, the server-side display control section 314 displays the service performed by the service performing unit 21 on the touch panel 41 of the terminal device 4, but the service performed by the service performing unit 21 does not necessarily have to be displayed on the touch panel 41 of the terminal device 4.

In addition, in the present embodiment, the server-side display control section 314 displays the availability of the device main body 2 and the time necessary for the reserved place on the touch panel 41 of the terminal device 4 based on the reservation information. However, either the availability of the device main body 2 or the time necessary for the reserved place may be displayed on the touch panel 41 of the terminal device 4, or these do not necessarily have to be displayed on the touch panel 41 of the terminal device 4.

The movement control section 312 causes the moving unit 22 to move the device main body 2 to the reserved place on the reservation date and time (reservation start time) based on the reservation information.

Here, the movement control section 312 may be formed to apply for a permission to a subscriber when the device main body 2 is caused to move in the movable area by obtaining the permission of the subscriber.

According to such a configuration, the movement control section 312 applies permission to the subscriber when moving the movable area to the device main body 2 by obtaining the permission of the subscriber. Therefore, for example, when the service device is caused to move an unmovable area such as a room locked by an electronic lock to a service device, the movement control section can apply to the subscriber for acquisition (permission) of an authentication key for locking/unlocking the electronic lock, and the subscriber can enter the room by unlocking the electronic lock.

The movement status notifying section 313 notifies the subscriber of a movement status of the device main body 2. Specifically, the movement status notifying section 313 notifies a subscriber of a movement status such as a current position of the device main body 2 and an estimated arrival time at the reserved place.

In addition, the server-side display control section 314 described above causes the touch panel 41 of the terminal device 4 to display a service provision time (provision amount) performed by the service performing unit 21 after ending the provision of the service by the service performing unit 21.

The server-side payment acceptance section 315 accepts payment according to the service provision time (provision amount) performed by the service performing unit 21 via the touch panel 41 of the terminal device 4.

The place securing execution section 316 secures a reserved place based on the reservation information. Specifically, when a parking lot or the like is set as the reserved place, the place securing execution section 316 automatically secures the reserved place and pays a parking fee.

When the abnormality informing section 271 of the device main body 2 informs an abnormality, the abnormality notifying section 317 notifies an administrator of the abnormality of the device main body 2. Specifically, the abnormality notifying section 317 notifies the administrator of the abnormality of the device main body 2 via a display device (not shown) connected to the management server 3.

The reservation management section 318 manages reservation information including a reservation start time and a reservation end time set by the reservation information setting section 311.

The command creation section 319 creates a command to the device main body 2. Specifically, the command creation section 319 creates various commands such as a notification command that notifies a reservation end time, an extension command that notifies whether a reserved time can be extended according to a reservation status, and a warning command that notifies a subscriber of a warning when the subscriber is present even after the reservation end time.

The command transmission section 320 transmits a command to the device main body 2 via the Internet 6.

The application receiving section 321 receives an extension application transmitted from the application transmission section 278 of the device main body 2. Then, the reservation management section 318 updates the reservation information by changing the reservation end time based on the extension application received by the application receiving section 321.

The presence management section 322 stores and manages human presence information such as a subscriber informed by the presence informing section 279 in the storage section 323.

Note that the storage section 323 is configured using a memory of the server-side control unit 31, but may be configured using a hard disk drive (HDD), network attached storage (NAS), or the like, or may be configured using a cloud service.

In addition, each function of the server-side control unit 31 is executed according to a program stored in the storage section 323, but may be configured using independent devices or by cloud computing.

Figure 4:
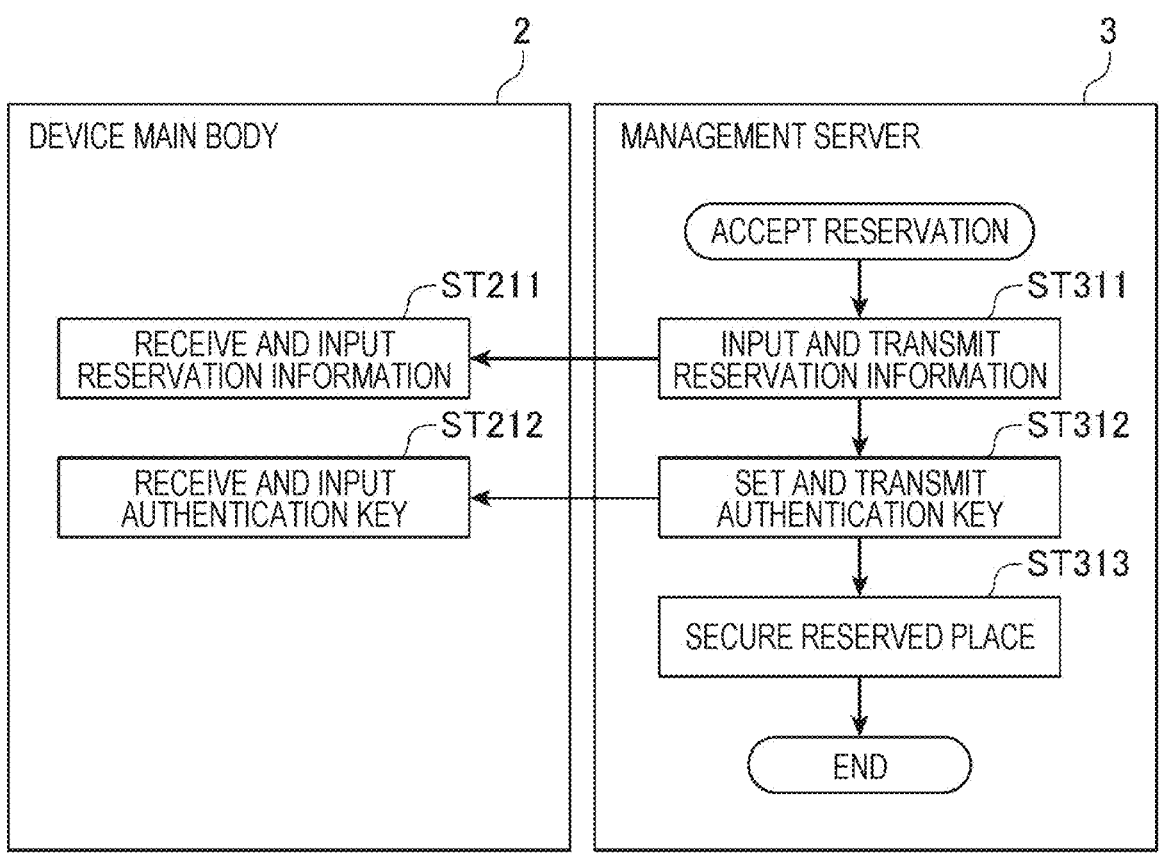
FIG. 4 is a flowchart showing operations of a device main body and a management server when a reservation of the device main body is accepted.

FIG. 4 is a flowchart showing operations of the device main body and the management server when the reservation of the device main body is accepted.

The management system 1 for an unmanned mobile service device executes processing in Steps ST211, ST212, and ST311 to ST313 as shown in FIG. 4 according to a predetermined program stored in a memory.

As described above, the subscriber can access the management server 3 or the reservation site 5 via the Internet 6 using the terminal device 4, specify use time, and reserve the device main body 2.

Note that in the present embodiment, it is configured such that the subscriber can access the management server 3 or the reservation site 5 via the Internet 6 using the terminal device 4 and execute a reservation of the device main body 2 by specifying the use time. However, it may be configured such that the subscriber can access only one of the management server 3 and the reservation site 5 and execute the reservation of the device main body 2.

The reservation information setting section 311 of management server 3 accepts the reservation of the device main body 2 via terminal device 4, and stores and sets the reservation information on a subscriber, a reserved place, and a reservation date and time (reservation start time and reservation end time) in the storage section 323 (Step ST311). In Step ST311, the reservation information setting section 311 transmits the reservation information stored in the storage section 323 to the device main body 2.

In the case of receiving the reservation information transmitted from the management server 3 in Step ST311, the device-side control unit 25 of the device main body 2 stores and sets the reservation information in the storage section 280 (Step ST211).

After executing Step ST311, the server-side control unit 31 of the management server 3 issues an authentication key corresponding to the service performing unit 21 of the device main body 2 regarding the reservation information, and transmits the authentication key to the device main body 2 and the terminal device 4 of the subscriber in association with the reservation information (Step ST312).

When receiving the reservation information including the authentication key transmitted from the management server 3 in Step ST312, the device-side control unit 25 of the device main body 2 stores and sets the reservation information in the storage section 280 (Step ST212).

After executing Step ST312, the place securing execution section 316 of the management server 3 secures a reserved place based on the reservation information (Step ST313). Specifically, when a parking lot or the like is set as the reserved place, the place securing execution section 316 automatically secures the reserved place and pays a parking fee.

After that, the server-side control unit 31 of the management server 3 ends the processing of the device main body 2 and the management server 3 when accepting the reservation of the device main body 2.

Figure 5:
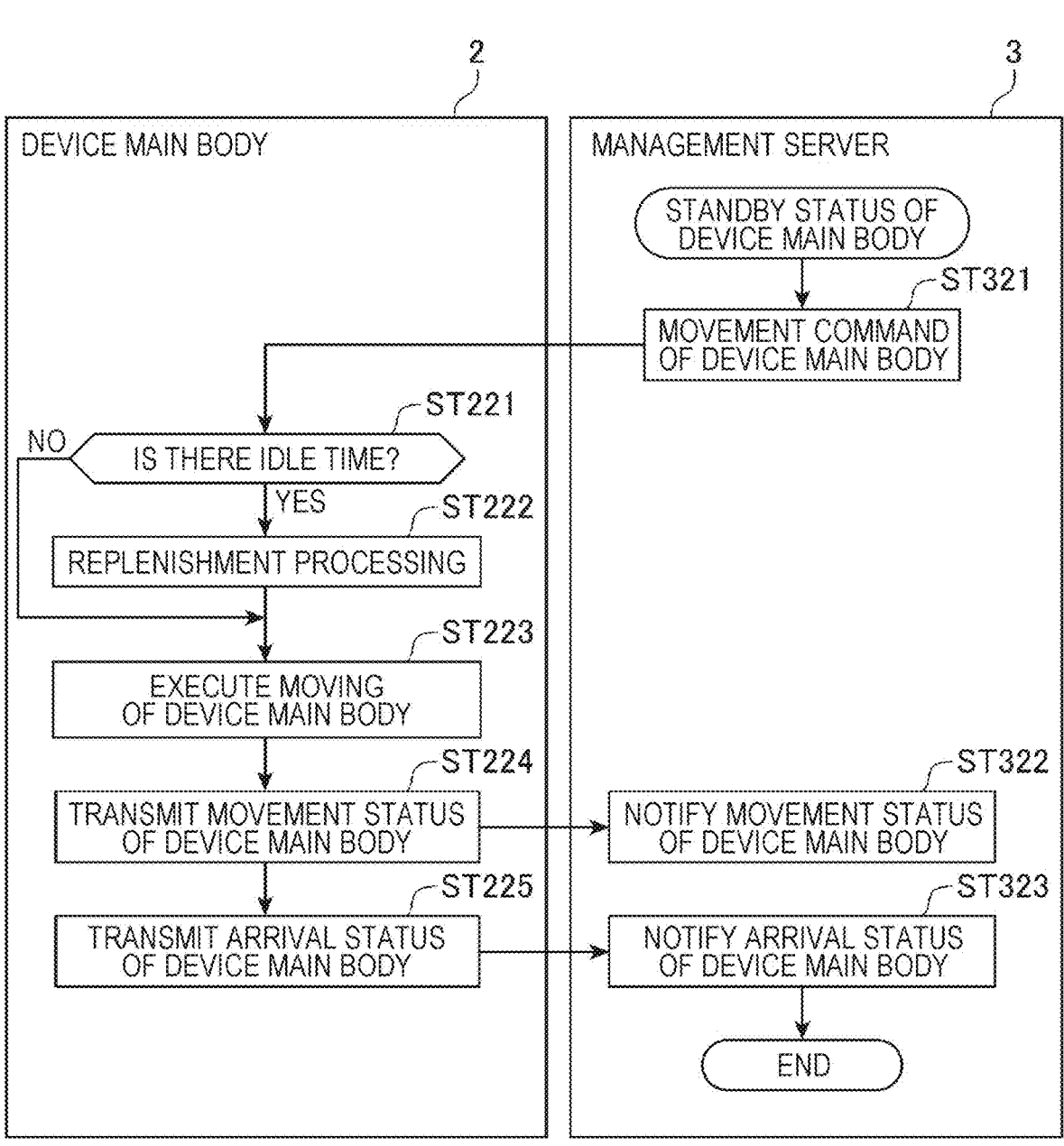
FIG. 5 is a flowchart showing operations of the device main body and the management server in a standby status of the device main body.

FIG. 5 is a flowchart showing operations of the device main body and the management server in the standby status of the device main body.

The management system 1 for an unmanned mobile service device executes processing in Steps ST221 to ST225, ST321 to ST323 as shown in FIG. 5 according to a predetermined program stored in the memory.

In the standby status of the device main body 2, the movement control section 312 of the management server 3 generates a movement command that causes the moving unit 22 to move the device main body 2 to the reserved place on the reservation date and time (reservation start time) based on the reservation information, and transmits the movement command to the device main body 2 (Step ST321).

Here, the server-side control unit 31 refers to operation information indicating the operation status of the device main body 2 to determine whether the device main body 2 is in the standby status. The operating information is stored in the storage section 323 in association with the device main body 2. When the movement command is transmitted to the device main body 2 in Step ST321, the server-side control unit 31 updates the operation information stored in the storage section 323 to a sales status. As a result, the server-side control unit 31 brings the device main body 2 into the sales status.

In the case of receiving the movement command transmitted from the management server 3 in Step ST321, the device-side control unit 25 of the device main body 2 determines whether there is idle time before the next reservation start time based on the reservation information (Step ST221). Specifically, the device-side control unit 25 determines that there is idle time when there is time to execute energy replenishment before the next reservation start time, and determines that there is no idle time when there is no time to execute the energy replenishment.

When it is determined in Step ST221 that there is no idle time, the device-side control unit 25 of the device main body 2 executes the processing in and after Step ST223.

On the other hand, when it is determined in Step ST221 that there is idle time, the device-side control unit 25 of the device main body 2 executes the replenishment processing in Step ST222.

In the replenishment processing in Step ST222, the energy determination section 266 of the device main body 2 determines whether energy (fuel, electric power, and the like) of the device main body 2 is insufficient. When the energy determination section 266 determines that the energy is insufficient, the energy replenishment execution section 267 executes the energy replenishment of the device main body 2.

After executing the replenishment processing in Step ST222, or when determining that there is no idle time in Step ST221, the device-side control unit 25 of the device main body 2 executes movement of the device main body 2 to the reserved place on the reservation date and time (reservation start time) (Step ST223).

After executing the processing in Step ST223, the device-side control unit 25 of the device main body 2 transmits the movement status of the device main body 2 to the management server 3 (Step ST224). While the device main body 2 is moving, the device-side control unit 25 periodically informs the movement status of the device main body 2.

In the case of receiving the movement status transmitted from the device main body 2 in Step ST224, the movement status notifying section 313 of the management server 3 reports the movement status of the device main body 2 to the subscriber (Step ST322). Specifically, the movement status notifying section 313 notifies a subscriber of a movement status such as a current position of the device main body 2 and an estimated arrival time at the reserved place.

After executing the processing in Step ST224, when the device main body 2 arrives at the reserved place, the device-side control unit 25 of the device main body 2 transmits an arrival status of the device main body 2 to the management server 3 (Step ST225).

In the case of receiving the arrival status transmitted from the device main body 2 in Step ST225, the movement status notifying section 313 of the management server 3 notifies the subscriber of the arrival status of the device main body 2 (Step ST323).

After that, the server-side control unit 31 of the management server 3 ends the processing of the device main body 2 and the management server 3 in the standby status of the device main body.

Figure 6:
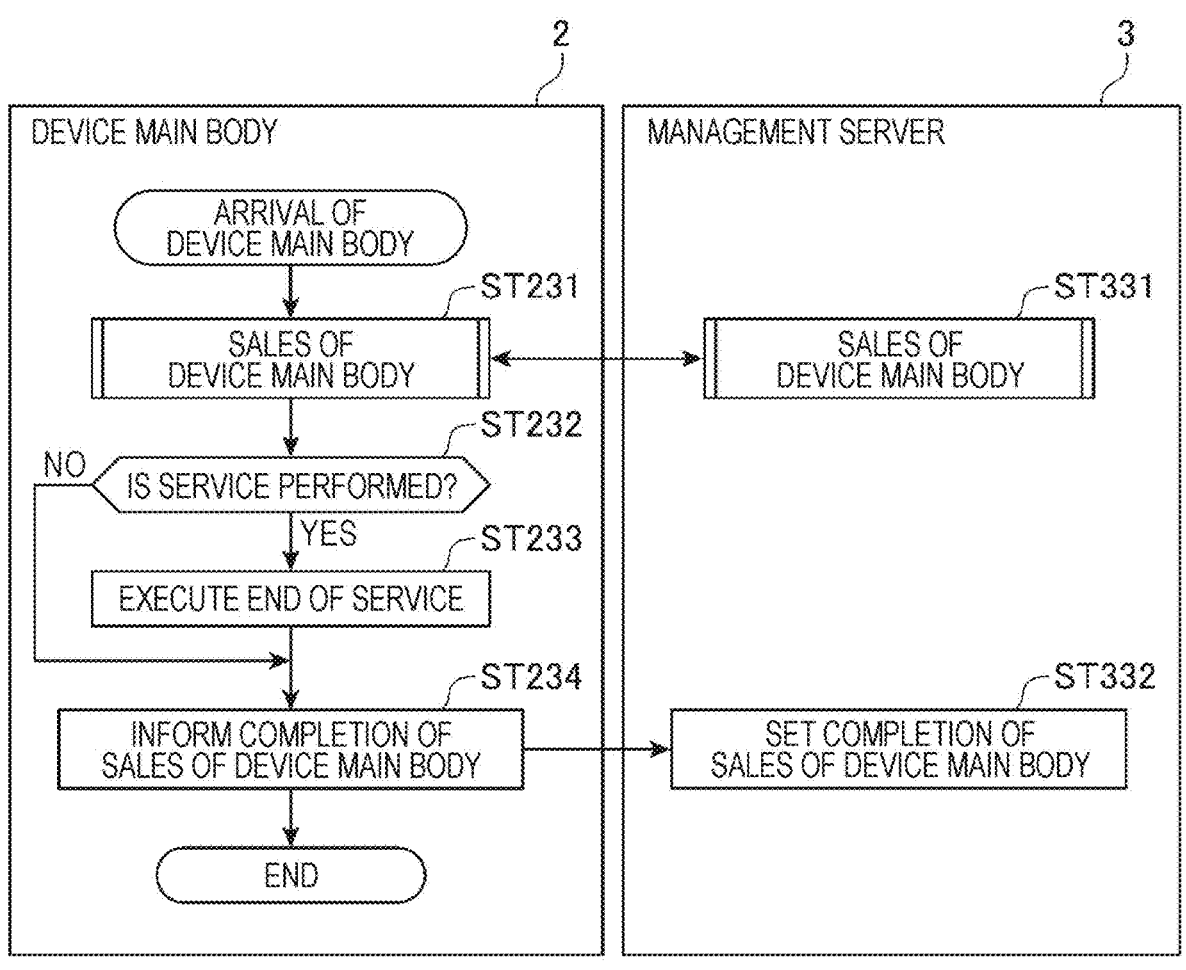
FIG. 6 is a flowchart showing operations of the device main body and the management server after arrival of the device main body.

FIG. 6 is a flowchart showing operations of the device main body and the management server after arrival of the device main body.

The management system 1 for an unmanned mobile service device executes processing in Steps ST231 to ST234, 331, 332 as shown in FIG. 6 according to a predetermined program stored in the memory.

After the arrival of the device main body 2, the device-side control unit 25 of the device main body 2 conducts sales of the device main body 2 (Step ST231). The server-side control unit 31 of the management server 3 conducts sales of the device main body 2 (Step ST331).

Specifically, the device-side control unit 25 of the device main body 2 and the server-side control unit 31 of the management server 3 perform sales of the device main body 2 in cooperation with each other by transmitting and receiving information to and from each other.

Figure 7:
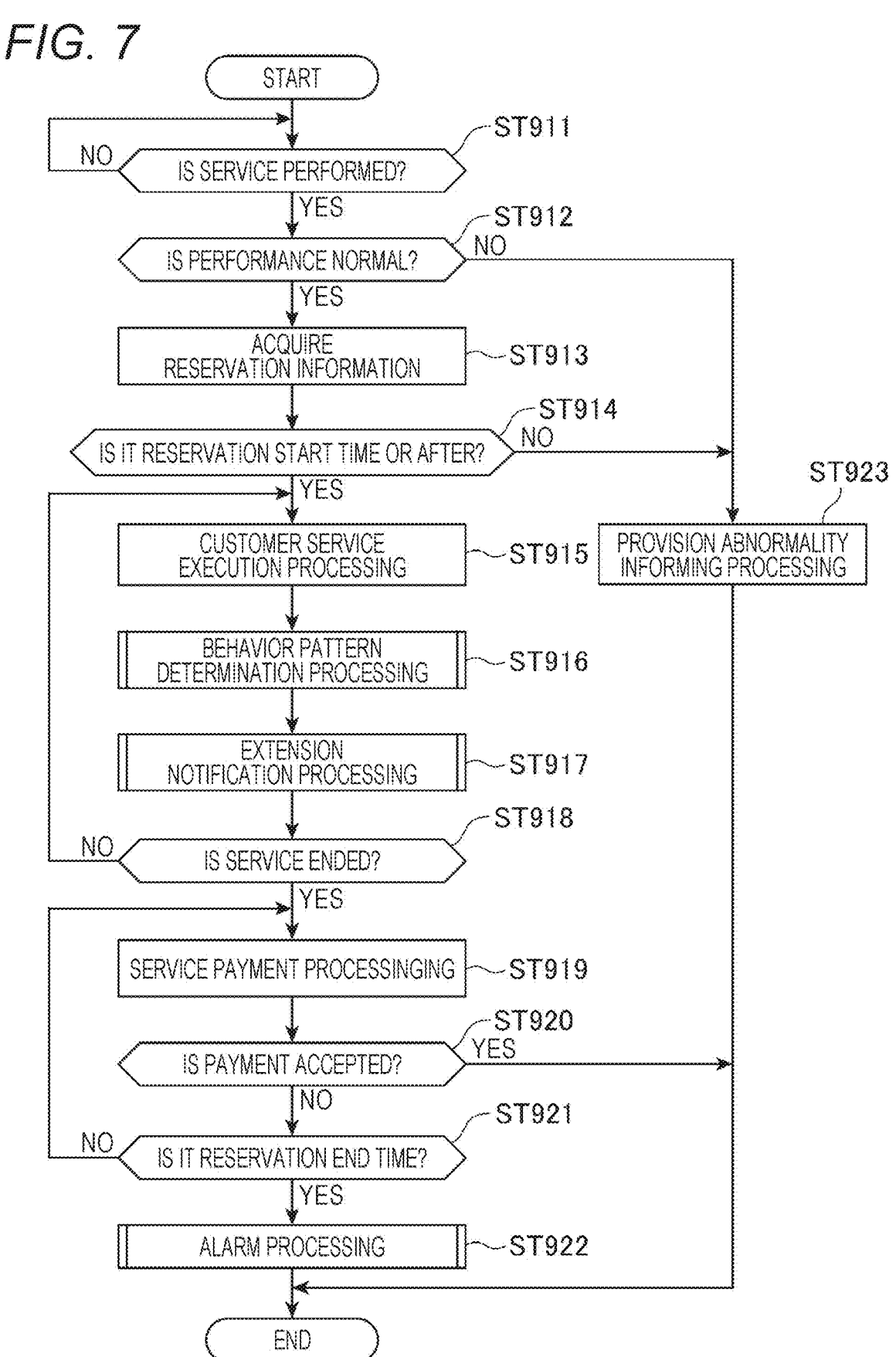
FIG. 7 is a flowchart showing an operation for conducting sales of the device main body.

FIG. 7 is a flowchart showing an operation for conducting sales of the device main body.

As shown in FIG. 7, the device main body 2 and the management server 3 execute sales processing of the device main body in Steps ST911 to ST923 according to a predetermined program stored in the memory.

Note that in the present embodiment, the operation of the device main body 2 and the operation of the management server 3 are collectively referred to as the operation of the management system 1 for an unmanned mobile service device, and this will be described using a common flowchart.

First, the device-side control unit 25 of the device main body 2 determines whether service provision has been performed (Step ST911).

Here, when the subscriber determination section 261 determines that a person is the subscriber, in other words, when the input of the authentication key is normally received via the touch panel 23, the provision setting section 262 causes the service performing unit 21 to provide a service.

When it is determined in Step ST911 that no service has been provided, the device-side control unit 25 repeatedly executes the processing in Step ST911.

On the other hand, when it is determined in Step ST911 that the service has been provided, the normal service provision determination section 272 normally accepts an input of an authentication key via the touch panel 23 to determine whether the service performing unit 21 is normally performing the service (Step ST912).

When it is determined in Step ST912 that the service performing unit 21 has not performed the service normally, the device-side control unit 25 executes provision abnormality informing processing in Step ST923 described later. The provision abnormality informing processing in Step ST923 will be described in detail later.

On the other hand, when it is determined in Step ST912 that the service performing unit 21 is performing the service normally, the normal service provision determination section 272 acquires reservation information from the storage section 280 (Step ST913).

After acquiring the reservation information from the storage section 280, the normal service provision determination section 272 determines whether the time when the service performing unit 21 normally performs the service is after the reservation start time based on the reservation information (Step ST914).

When it is determined in Step ST914 that it is not after the reservation start time, the device-side control unit 25 executes the provision abnormality informing processing in Step ST923 described later. The provision abnormality informing processing in Step ST923 will be described in detail later.

On the other hand, when it is determined in Step ST914 that it is after the reservation start time, i.e., when the normal service provision determination section 272 determines that the service performing unit 21 normally performs the service after the reservation start time, the customer service execution section 273 executes the customer service using the touch panel 23 (Step ST915: customer service executing processing). Specifically, the customer service execution section 273 displays sales points of the service on the display screen of the touch panel 23 and starts the explanation to the subscriber.

After executing the customer service execution processing in Step ST915, the device-side control unit 25 executes the behavior pattern determination processing in Step ST916 and executes the extension notification processing in Step ST917.

The behavior pattern determination processing in Step ST916 and the extension notification processing in Step ST917 will be described in detail later.

After executing the extension notification processing in Step ST917, the provision setting section 262 determines whether the service performing unit 21 has ended the provision of the service (Step ST918: service end determination processing). Here, the provision setting section 262 causes the service performing unit 21 to end the provision of the service after accepting an operation input to end the provision of the service via the touch panel 23 or when the reservation end time comes.

When it is determined in Step ST918 that the provision of the service has not been ended, the device-side control unit 25 repeatedly executes the processing in and after Step ST915 described above.

On the other hand, when it is determined in Step ST918 that the provision of the service has been ended, the device-side control unit 25 executes payment of the service using the touch panel 23, and the server-side control unit 31 executes the payment of the service using the touch panel 41 (Step ST919: service payment processing).

Specifically, in the service payment processing in Step ST919, the device-side display control section 264 causes the touch panel 23 to display the provision amount of the service performed by the service performing unit 21 after causing the service performing unit 21 to end the provision of the service. Then, the device-side payment acceptance section 265 accepts payment according to the provision amount of the service performed by the service performing unit 21 via the touch panel 23.

In addition, in the service payment processing in Step ST919, the server-side display control section 314 causes the service performing unit 21 to end the provision of the service and then causes the touch panel 41 of the terminal device 4 to display the provision amount of the service performed by the service performing unit 21. Then, the server-side payment acceptance section 315 accepts payment according to the provision amount of the service performed by the service performing unit 21 via the touch panel 41 of the terminal device 4.

After executing the service payment processing in Step ST919, the device-side control unit 25 determines whether payment according to the provision amount of the service provided to the subscriber is accepted (Step ST920).

When it is determined in Step ST920 that payment has been accepted, the device main body 2 and the management server 3 end the sales processing of the device main body without executing the processing in and after Step ST921.

On the other hand, when it is determined in Step ST920 that payment has not been accepted, the device-side control unit 25 determines whether the current time is after the reservation end time (Step ST921).

When it is determined in Step ST921 that it is not after the reservation end time, the device-side control unit 25 repeatedly executes the processing in and after Step ST919 described above.

On the other hand, when it is determined in Step ST921 that it is after the reservation end time, the device-side control unit 25 executes alarm processing in Step ST922. After that, the device main body 2 and the management server 3 end the sales processing of the device main body.

Note that the alarm processing in Step ST922 will be described in detail later.

When it is determined in Step ST912 that the service performing unit 21 has not performed the service normally, and when it is determined in Step ST914 that it is not after the reservation start time, as described above, the device-side control unit 25 executes the provision abnormality informing processing in Step ST923. In other words, in the case of detecting an abnormality occurring in the device main body 2, the device-side control unit 25 executes provision abnormality informing processing in Step ST923.

In the provision abnormality informing processing in Step ST923, the abnormality informing section 271 of the device main body 2 notifies the management server 3 of an abnormality of the device main body 2 via the Internet 6.

When the abnormality informing section 271 informs the abnormality of the device main body 2, the abnormality notifying section 317 of the management server 3 notifies the administrator of the abnormality of the device main body 2. Specifically, the abnormality notifying section 317 notifies the administrator of the abnormality of the device main body 2 via a display device (not shown) connected to the management server 3.

<Action Pattern Determination Processing>

Figure 8:
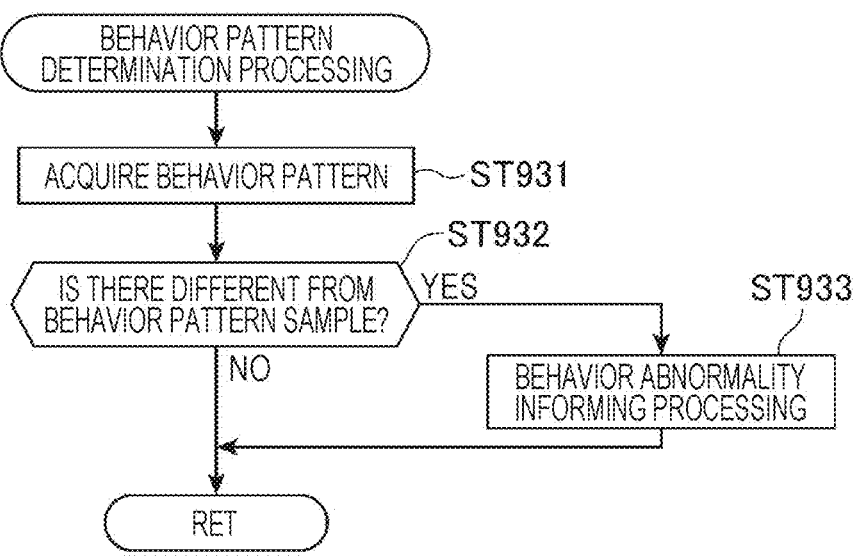
FIG. 8 is a flowchart showing behavior pattern determination processing.

FIG. 8 is a flowchart showing the behavior pattern determination processing.

As shown in FIG. 8, the device-side control unit 25 executes the behavior pattern determination processing in Steps ST931 to 933 according to a predetermined program stored in the memory.

In the behavior pattern determination processing, the behavior pattern acquisition section 274 acquires the behavior pattern of the subscriber based on the image captured by the imaging unit 24 (Step ST931).

After acquiring the behavior patterns of the subscriber in Step ST931, the behavior pattern determination section 275 compares a plurality of samples of the behavior patterns stored in the storage section 280 with the behavior pattern acquired by the behavior pattern acquisition section 274, and determines whether the plurality of samples of the behavior pattern stored in the storage section 280 are different from the behavior pattern acquired by the behavior pattern acquisition section 274 (Step ST932).

When it is determined in Step ST932 that there is no difference, the device-side control unit 25 ends the behavior pattern determination processing.

On the other hand, when it is determined in Step ST932 that there is a difference, the device-side control unit 25 executes the behavior abnormality informing processing in Step ST933. In other words, the device-side control unit 25 executes the behavior abnormality informing processing in Step ST933 in the case of detecting an abnormality occurring in the device main body 2.

In the behavior abnormality informing processing in Step ST933, the abnormality informing section 271 of the device main body 2 notifies the management server 3 of the abnormality of the device main body 2 via the Internet 6.

When the abnormality informing section 271 informs the abnormality of the device main body 2, the abnormality notifying section 317 of the management server 3 notifies the administrator of the abnormality of the device main body 2. Specifically, the abnormality notifying section 317 notifies the administrator of the abnormality of the device main body 2 via a display device (not shown) connected to the management server 3.

<Extension Notification Processing>

Figure 9:
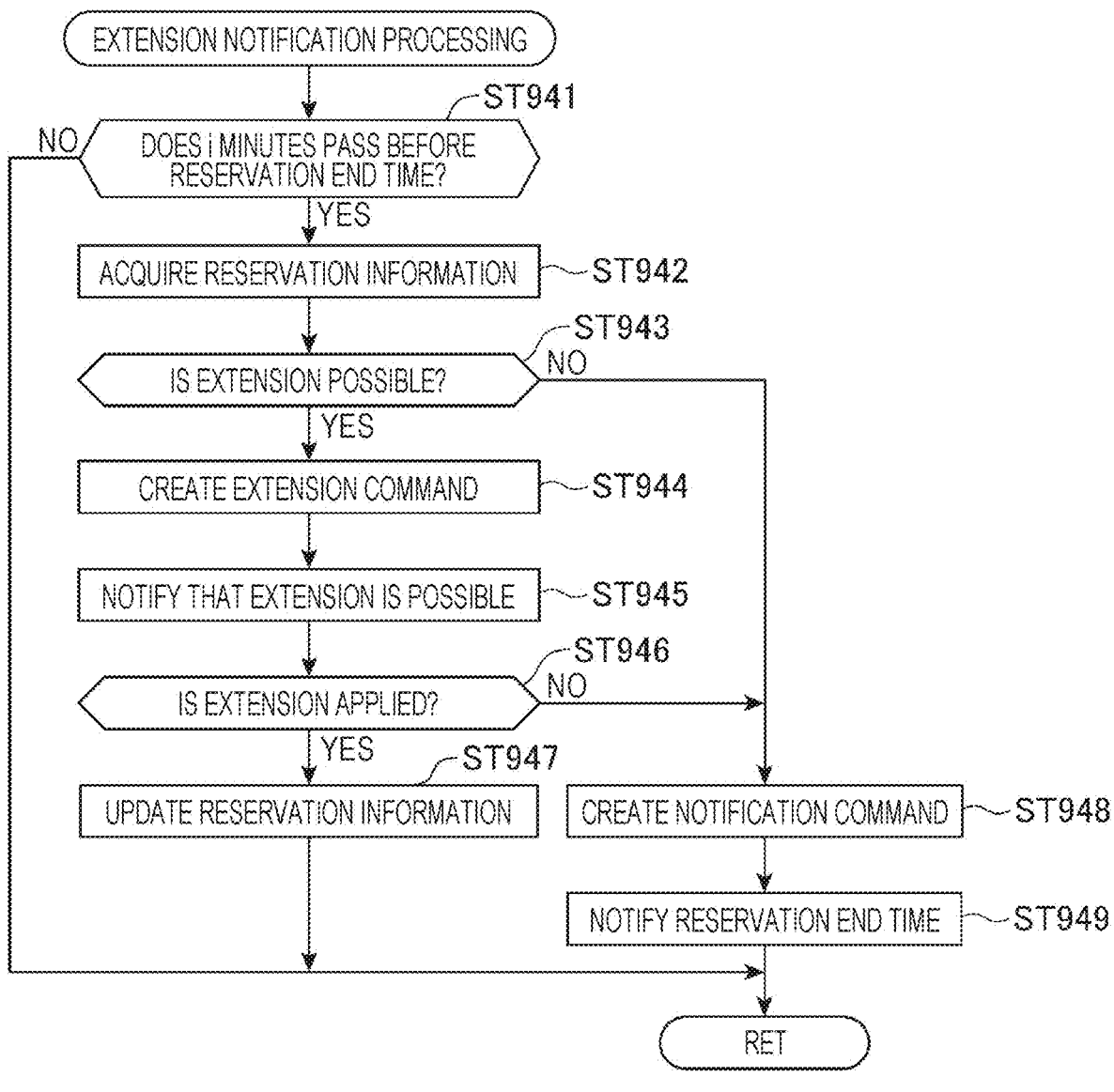
FIG. 9 is a flowchart showing extension notification processing.

FIG. 9 is a flowchart showing an extension notification processing.

As shown in FIG. 9, the server-side control unit 31 of the management server 3 executes the extension notification processing in Step ST941 to 949 according to a predetermined program stored in the memory.

In the extension notification processing, the server-side control unit 31 determines whether a time a predetermined time i (time set by the administrator, for example, 10 minutes) before the reservation end time has elapsed (Step ST941).

When it is determined in Step ST941 that the time has passed, the server-side control unit 31 acquires reservation information from the storage section 323 (Step ST942).

After acquiring the reservation information from the storage section 323, the server-side control unit 31 checks whether there is a vacancy for a predetermined time (for example, 30 minutes) or more after the reservation end time based on the reservation information, and determines whether the reservation time can be extended (Step ST943).

When it is determined in Step ST943 that the reserved time can be extended, the command creation section 319 creates a command for the device main body 2 based on the reservation information. Specifically, the command creation section 319 creates an extension command that notifies whether the reserved time can be extended according to the reservation status (Step ST944). In the present embodiment, the command creation section 319 creates, as extension commands, availability information indicating that "the reserved time can be extended" as information indicating that the reserved time can be extended, and extension time information indicating that "the reserved time can be extended up to 2 hours" as extendable time.

The command transmission section 320 transmits the extension command to device main body 2 via the Internet 6.

Then, the command receiving section 276 of the device main body 2 receives the extension command from the management server 3.

Then, the command execution section 277 executes a predetermined operation based on the extension command received by the command receiving section 276. Specifically, the command execution section 277 causes the display screen of the touch panel 23 to display information such as "The reserved time can be extended", "The reserved time can be extended up to 2 hours", and "When the reserved time is extended, please apply for extension from the screen" to notify the subscriber (Step ST945).

After notifying the subscriber that the reserved time can be extended, the device-side control unit 25 determines whether the input of the extension application by the subscriber has been received via the touch panel 23 (Step ST946).

When it is determined in Step ST946 that the input of the extension application by the subscriber has been received, the application transmission section 278 transmits, to the management server 3, an extension application for applying for extension of the reserved time by the subscriber. In other words, in the case of receiving the extension application input from the subscriber via the touch panel 23, the application transmission section 278 transmits the extension application to the management server 3 via the Internet 6. Therefore, in the present embodiment, the touch panel 23 functions as an extension acceptance unit that accepts an extension application input by the subscriber.

When the application transmission section 278 transmits the extension application, the application receiving section 321 of the management server 3 receives the extension application transmitted from the application transmission section 278 of the device main body 2. Then, the reservation management section 318 updates the reservation information by changing the reservation end time based on the extension application received by the application receiving section 321 (Step ST947). After that, the device main body 2 and the management server 3 end the extension notification processing.

On the other hand, when it is determined in Step ST946 that the input of the extension application by the subscriber has not been accepted (When the subscriber selects not to extend the reserved time, when the operation of touch panel 23 is not detected during a predetermined time, or the like,), the application transmission section 278 transmits a non-extension application to the management server 3 instead of the extension application for applying for extension of the reserved time by the subscriber.

When the application transmission section 278 transmits the non-extension application, the application receiving section 321 of the management server 3 receives the non-extension application transmitted from the application transmission section 278 of the device main body 2. Then, the command creation section 319 creates a command to the device main body 2 based on the reservation information. Specifically, the command creation section 319 creates a notification command that notifies the reservation end time (Step ST948).

Then, the command transmission section 320 transmits the notification command to device main body 2 via the Internet 6.

After that, the command receiving section 276 of the device main body 2 receives the notification command from the management server 3.

Then, the command execution section 277 executes a predetermined operation based on the notification command received by the command receiving section 276. Specifically, the command execution section 277 causes the display screen of the touch panel 23 to display information of "i minutes left until the reservation end time" to notify the subscriber of the reservation end time (Step ST949). After that, the device main body 2 and the management server 3 end the extension notification processing.

As a unit for notifying the subscriber of the reservation end time, in addition to that the reservation end time may be displayed on the display screen of the touch panel 23 and notified, for example, the reservation end time may be notified by sounding an alarm or may be notified by gradually darkening the illumination of the device main body 2.

<Warning Processing>

Figure 10:
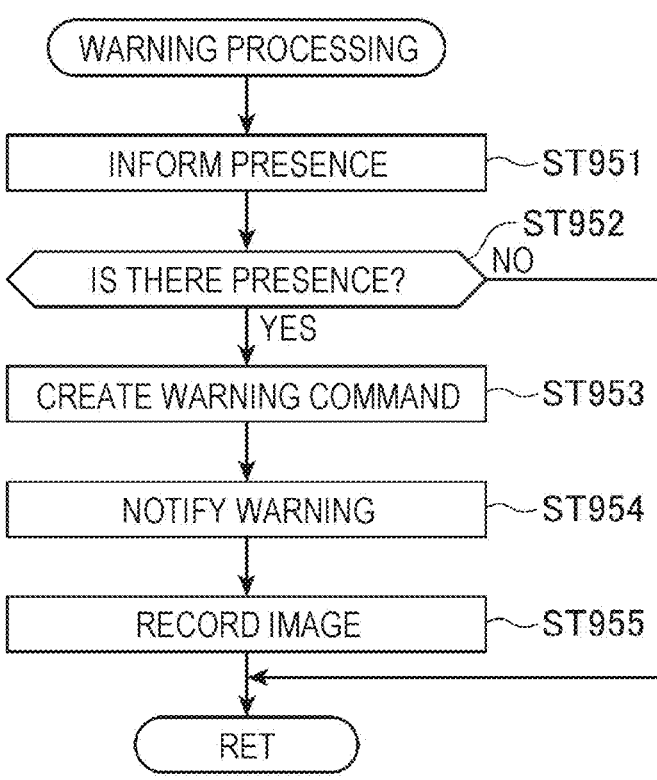
FIG. 10 is a flowchart showing warning processing.

FIG. 10 is a flowchart showing warning processing.

As shown in FIG. 10, the server-side control unit 31 of the management server 3 executes the warning processing in Step ST951 to 955 according to a predetermined program stored in the memory.

In the warning process, when the imaging unit 24 detects the presence of the subscriber, the presence informing section 279 of the device main body 2 informs the management server 3 of the presence of the subscriber via the Internet 6 (Step ST951).

When the presence of the subscriber is informed to the management server 3 via the Internet 6 in Step ST951, the presence management section 322 of the management server 3 stores and manages the presence information of the subscriber informed by the presence informing section 279 in the storage section 323.

Then, based on the presence information stored in the storage section 323, the server-side control unit 31 of the management server 3 determines whether a subscriber is present in the device main body 2 after the reservation end time (Step ST952).

When it is determined in Step ST952 that no subscriber is present in the device main body 2 after the reservation end time, the device main body 2 and the management server 3 end the warning processing without executing the processes in and after Step ST953.

On the other hand, when it is determined in Step ST952 that there is a subscriber in the device main body 2 after the reservation end time, the command creation section 319 creates a command to the device main body 2 based on the reservation information. Specifically, the command creation section 319 creates a warning command that notifies the subscriber of a warning (Step ST953).

Then, the command transmission section 320 transmits the warning command to the device main body 2 via the Internet 6.

After that, the command receiving section 276 of the device main body 2 receives the warning command from the management server 3.

Then, the command execution section 277 executes a predetermined operation based on the warning command received by the command receiving section 276. Specifically, the command execution section 277 displays information of "The reservation end time has ended" on the display screen of the touch panel 23 to notify the subscriber that the reservation end time has ended (Step ST954). In addition, the command execution section 277 captures an image of the vicinity of the device main body 2 by the imaging unit 24 and stores the image in the storage section 280 (Step ST955). After that, the device main body 2 and the management server 3 end the warning processing.

Returning to FIG. 6, the operation of the device main body and the management server after the arrival of the device main body will be further described.

After conducting the sales of the device main body 2, in other words, after ending the sales processing of the device main body, the provision determination section 263 of the device main body 2 determines whether the service performing unit 21 is caused to provide a service (Step ST232).

When it is determined in Step ST232 that the service performing unit 21 is caused to provide a service, the provision determination section 263 automatically ends the provision of the service (Step ST233).

After executing the processing in Step ST233 or when it is determined in Step ST232 that the service performing unit 21 is not caused to provide a service, the device-side control unit 25 informs the management server 3 of the completion of the sales by the device main body 2 via the Internet 6 (Step ST234). After that, the device-side control unit 25 puts the device main body 2 into a standby status.

When the device-side control unit 25 informs the server-side control unit 31 of the completion of the sales by the device main body 2, the server-side control unit 31 sets the completion of the sales by the device main body 2 (Step ST332). Specifically, the server-side control unit 31 updates the operation information stored in the storage section 323 to the standby status. As a result, the server-side control unit 31 sets the device main body 2 to the standby status.

According to the present embodiment as described above, the following operations and effects can be achieved.

(1) The device main body 2 includes the service performing unit 21 that performs a service without internally accepting a user. In addition, the management server 3 includes the reservation information setting section 311 that stores and sets reservation information related to a reserved place in the storage section 280, and the movement control section 312 that causes the moving unit 22 to move the device main body 2 to the reserved place based on the reservation information set by the reservation information setting section 311. Therefore, the device main body 2 is capable of moving to a predetermined place in an unmanned manner, and is capable of actively providing a service to the user. The subscriber can receive the service provided by the service performing unit 21 of the device main body 2 by going to the reserved place or waiting at the reserved place.

(2) Since the service performing unit 21 performs the service by accepting the authentication key issued from the management server 3 to the terminal device 4, the service can be performed when the authentication key is accepted from the user, and the user can cause the service performing unit 21 to perform the service at a desired timing.

(3) Since the service performing unit 21 performs the service by accepting an operation input transmitted from the terminal device 4, the user can operate the terminal device 4 to cause the service performing unit 21 to perform the service. Therefore, the management system 1 for an unmanned mobile service device can improve the convenience of the user.

(4) Since the server-side display control section 314 causes the touch panel 41 of the terminal device 4 to display availability of the device main body 2 and time necessary for the reserved place based on the reservation information, the user can confirm the availability of the device main body 2 and the time necessary for the reserved place. Therefore, the management system 1 for an unmanned mobile service device can improve the convenience of the user.

(5) Since the movement control section 312 causes the moving unit 22 to move the device main body 2 to the reserved place on the reservation date and time based on the reservation information, the device main body 2 is capable of moving to a predetermined place at a predetermined time in an unmanned manner, and capable of actively providing a service to the user. Further, the subscriber can receive the service provided by the service performing unit 21 of the device main body 2 by going to the reserved place on the reservation date and time or waiting at the reserved place.

(6) Since the server-side control unit 31 includes the movement status notifying section 313 that notifies the subscriber of the movement status of the device main body 2, the subscriber can easily grasp the movement status of the device main body 2, and confirm the current position of the device main body 2, the predicted arrival time at the reserved place, and the like.

(7) Since the device-side control unit 25 includes the subscriber determination section 261 that determines whether a person is the subscriber based on reservation information, and the provision setting section 262 that causes the service performing unit 21 to perform a service when the subscriber determination section 261 determines that the person is the subscriber, the subscriber can receive the service performed by the service performing unit 21 of the device main body 2 after the subscriber determination section 261 determines whether a person is the subscriber.

(8) Since the device-side control unit 25 includes the device-side display control section 264 that causes the touch panel 23 to display a provision amount of the service performed by the service performing unit 21 after causing the service performing unit 21 to finish providing the service, and the device-side payment acceptance section 265 that accepts payment according to the provision amount of the service performed by the service performing unit 21 via the touch panel 23, the subscriber can perform payment according to the provision amount of the service performed by the service performing unit 21 via the touch panel 23.

(9) Since the server-side control unit 31 includes the server-side display control section 314 that causes the touch panel 41 to display the provision amount of the service performed by the service performing unit 21 after causing the service performing unit 21 to finish providing the service, and the server-side payment acceptance section 315 that accepts payment according to the provision amount of the service performed by the service performing unit 21 via the touch panel 41, the subscriber can perform payment according to the provision amount of the service performed by the service performing unit 21 via the touch panel 41.

(10) Since the device-side control unit 25 includes the provision determination section 263 that determines whether the service performing unit 21 is providing the service, for example, it is determined whether the service performing unit is providing the service at the reservation end time, and when it is determined that the service is being provided, it is possible to automatically end the service.

(11) Since the server-side control unit 31 includes the place securing execution section 316 that executes securing of a reserved place based on reservation information, for example, even when a parking lot or the like is used as the reserved place, it is possible to automatically secure the reserved place and pay the parking fee.

(12) Since the device-side control unit 25 includes the energy determination section 266 that determines whether the energy of the device main body 2 is insufficient and the energy replenishment execution section 267 that executes energy replenishment of the device main body 2 when the energy determination section 266 determines that the energy is insufficient, it is possible to automatically execute the energy replenishment of the device main body 2.

(13) Since the server-side control unit 31 includes the server-side display control section 314 that causes the touch panel 41 to display the service to be performed by the service performing unit 21, the subscriber can confirm the service to be performed by the service performing unit 21 of the device main body 2 before reservation.

(14) Since the server-side control unit 31 includes the abnormality notifying section 317 that notifies the administrator of an abnormality of the device main body 2 when the abnormality informing section 271 informs the abnormality of the device main body 2, the administrator can easily grasp the abnormality such as the damage of the device main body 2 or the unauthorized use of the device main body 2 even in the unmanned mobile service device capable of moving to a predetermined place in an unmanned manner and capable of actively providing the service to the user.

(15) Since the device-side control unit 25 includes the normal service provision determination section 272 that determines whether the service performing unit 21 is normally performing the service and detects the abnormality occurring in the device main body 2 when determining that the service is not normally performed, for example, unlike a subscriber who can normally receive the provision of the service performed by the service performing unit 21 of the device main body 2, i.e., the subscriber permitted by the administrator, the normal service provision determination section 272 can detect the use of the service by the user using an unauthorized unit as the abnormality, and it is possible to improve the safety of the device main body 2.

(16) Since the device-side control unit 25 includes the customer service execution section 273 that executes customer service using the touch panel 23 when the normal service provision determination section 272 determines that the service performing unit 21 is normally performing service, it is possible to execute customer service using the touch panel 23 for a subscriber who can normally receive service provision, i.e., a subscriber who is permitted by the administrator.

(17) The device-side control unit 25 includes the behavior pattern determination section 275 that compares a sample of a normal behavior pattern of the subscriber of the device main body 2 with the behavior pattern acquired by the behavior pattern acquisition section 274 to determine whether the sample of the normal behavior pattern of the subscriber of the device main body 2 is different from the behavior pattern acquired by the behavior pattern acquisition section 274, and detects an abnormality occurring in the device main body 2 when it is determined that the sample of the normal behavior pattern of the subscriber of the device main body 2 is different from the behavior pattern acquired by the behavior pattern acquisition section 274. Therefore, for example, by storing the behavior pattern matching the normal subscriber such as operating the device main body 2 in the storage section 280 as the normal behavior pattern, it is possible to detect, as an abnormality, an intruder with a behavior suspicious behavior pattern such as disassembling the device main body 2 by the behavior pattern determination section 275, and to improve the safety of the device main body 2.

(18) Since the device-side control unit 25 includes the command receiving section 276 that receives a command from the command transmission section 320 and the command execution section 277 that executes a predetermined operation based on the command received by the command receiving section 276, it is possible to approach the subscriber who uses the device main body 2 by executing an operation based on an appropriate command. Therefore, for example, by notifying the subscriber of the reservation end time, the device-side control unit 25 can suppress the time excess, set the idle time until the next subscriber makes a reservation to be short, and increase the utilization rate of the device main body 2.

(19) Since the command execution section 277 notifies the subscriber of the reservation end time based on the notification command, the device-side control unit 25 can suppress the time excess by notifying the subscriber of the reservation end time, set the idle time until the next subscriber makes a reservation to be short, and increase the utilization rate of the device main body 2.

(20) Since the command execution section 277 notifies the subscriber of whether the extension is possible based on the extension command, when the device main body 2 has idle time after the reservation end time, it is possible to notify the subscriber that the extension is possible. In addition, when there is no idle time of the device main body 2 after the reservation end time, it is possible to notify the subscriber that the extension is impossible.

(21) Since the server-side control unit 31 includes the application receiving section 321 that receives an extension application transmitted from the application transmission section 278, and the reservation management section 318 changes the reservation end time based on the extension application received by the application receiving section 321 to update the reservation information, it is possible to execute the extension processing based on the extension application of the subscriber.

Second Embodiment

In the following, a second embodiment of the present invention will be described with reference to the drawings.

Figure 11:
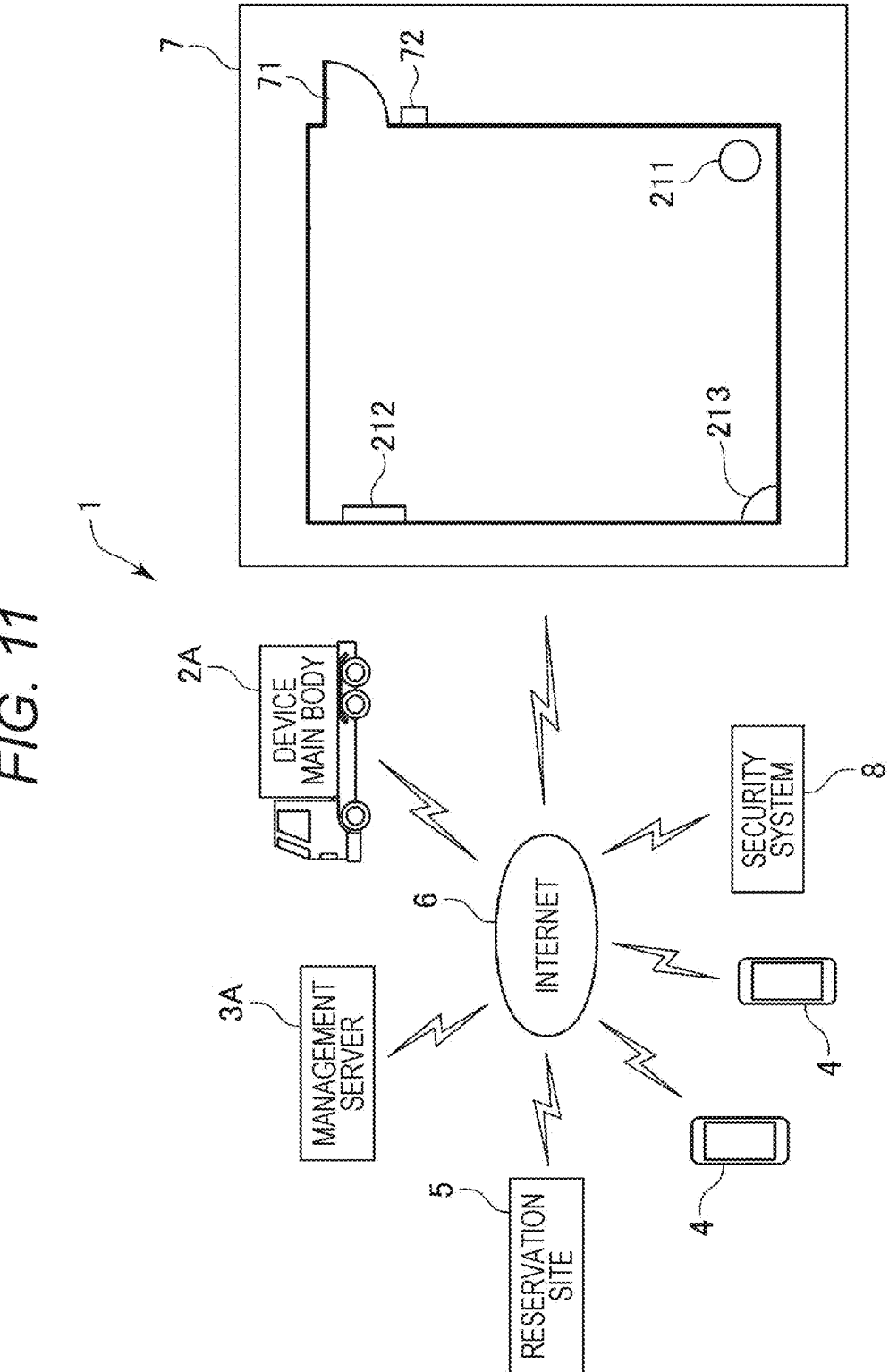
FIG. 11 is a schematic configuration diagram of a management system for an unmanned mobile service device according to a second embodiment of the present invention.

FIG. 11 is a schematic configuration diagram of a management system for an unmanned mobile service device according to the second embodiment of the present invention.

In the first embodiment, the management system 1 for an unmanned mobile service device includes the device main body 2, the management server 3, the terminal device 4, and the reservation site 5.

On the other hand, in the present embodiment, as shown in FIG. 11, in addition to a device main body 2A, a management server 3A, and the like, a management system 1 for an unmanned mobile service device further includes a maintenance site 7 having a function similar to that of the maintenance site in the first embodiment and installed at a predetermined place to execute maintenance of the device main body 2A, and an external security system 8 connected via the Internet 6.

Note that in the following description, the components already described are denoted by the same reference numerals, and the description thereof is omitted.

Here, in the present embodiment, the maintenance site 7 adopts an opening and closing door 71 that opens and closes the maintenance site 7, and a lock device 72 that allows the opening and closing door 71 to open with an authentication key such as a bar code and an optical code such as a QR code (registered trademark). Therefore, an administrator can enter the maintenance site 7 by opening and closing the opening and closing door 71 of the maintenance site 7 with the authentication key.

In addition, in the present embodiment, the lock device 72 can open the opening and closing door 71 by transmitting and receiving a predetermined identification signal and recognizing the device main body 2A. Therefore, the device main body 2A can enter the maintenance site 7 by opening and closing the opening and closing door 71 of the maintenance site 7.

The maintenance site 7 includes a maintenance devices 211 and 212 that perform maintenance of the device main body 2A, and a sensor device 213 that detects the presence or absence of a moving body near the device main body 2A as a detection unit.

Note that in the present embodiment, the sensor device 213 installed in the maintenance site 7 is adopted as the detection unit, but the imaging unit 24 of the device main body 2 may be adopted.

The devices 211 to 213 are so-called Internet of Things (IoT) devices, and is connected to the Internet 6. The devices 211 to 213 can transmit various pieces of information to and from an external device including the management system 1 for an unmanned mobile service device via the Internet 6, appropriately control the operation of the devices 211 to 213 by the management server 3A and the security system 8, and transmit appropriate information from the devices 211 to 213 to the management server 3A and the security system 8.

Specifically, the maintenance device 211 is a robot vacuum cleaner that cleans the device main body 2A. The maintenance device 212 is a deodorizing device that deodorizes the device main body 2A. The sensor device 213 is an infrared sensor that detects the presence or absence of a moving body near the device main body 2A.

Note that the maintenance device may be any device as long as the maintenance device is a device that performs maintenance of the device main body 2A, and may be a device different from each of the devices described above, for example, a device that performs sterilization, antibacterial, sterilization, sterilization, disinfection, and the like of viruses and the like.

FIG. 12 is a schematic configuration diagram showing functions of the management server.

As shown in FIG. 12, the server-side control unit 31 of the management server 3A has a functional configuration (sections 311 to 323) similar to that of the management server 3 in the first embodiment, and further includes a device management section 331, an idle time acquisition section 332, a status determination section 333, a management mode switching section 334, a maintenance determination section 335, a security mode switching section 336, a security abnormality detection section 337, a security abnormality notifying section 338, and a security command transmission section 339.

The device management section 331 manages the devices 211 to 213 and sets commands to the devices 211 to 213. The device management section 331 manages the necessary time for execution of maintenance by each of the maintenance devices 211 and 212 to perform maintenance. Here, the necessary time may be calculated based on information such as the size of the device main body 2A or information such as the performance of each of the maintenance devices 211 and 212, or may be a predetermined necessary time.

The idle time acquisition section 332 acquires the idle time of the device main body 2A based on the reservation information. Specifically, after setting the completion of sales by the device main body 2A, the idle time acquisition section 332 acquires, as the idle time of the device main body 2A, the time until the time when a movement command needs to be transmitted to the device main body 2A in order to cause a moving unit 22 to move the device main body 2A to the reserved place on the reservation date and time.

Based on the detection result of the sensor device 213 and the acquisition result of the idle time acquisition section 332, the status determination section 333 determines whether time is an idle time of the device main body 2A and the device main body 2A is in an unused status where there is no moving body near the device main body 2A.

When the status determination section 333 determines that the device is in an unused status, the management mode switching section 334 switches the management mode of the device main body 2A from the normal mode to the maintenance mode. This maintenance mode is a mode in which each of the maintenance devices 211 and 212 performs maintenance of the device main body 2A.

Note that in the present embodiment, the status determination section 333 determines whether the device main body 2A is in the unused status where there is no moving body near the device main body 2A based on the detection result of the sensor device 213, and the management mode switching section 334 switches the management mode of the device main body 2A from the normal mode to the maintenance mode when the status determination section 333 determines that the device main body 2A is in the unused status.

On the other hand, for example, the status determination section may determine whether time is idle time of the device main body based only on the acquisition result of the idle time acquisition section, and the management mode switching section may switch the management mode of the device main body from the normal mode to the maintenance mode when the status determination section determines that it is the idle time of the device main body. In such a configuration, the management system for an unmanned mobile service device does not necessarily have to include the detection unit.

When the management mode switching section 334 switches to the maintenance mode, the maintenance determination section 335 determines whether the maintenance of the device main body 2A can be executed based on the idle time acquired by the idle time acquisition section 332 and the necessary time of each of the maintenance devices 211 and 212.

Then, when the maintenance determination section 335 determines that the maintenance is feasible, the device management section 331 sets a maintenance command that executes the maintenance of the device main body 2A and transmits the maintenance command to each of the maintenance devices 211 and 212 to cause each of the maintenance devices 211 and 212 to execute the maintenance.

Upon receiving the maintenance command, each of the maintenance devices 211 and 212 executes a predetermined operation based on the maintenance command and transmits its operation status to the management server 3A.

Specifically, upon receiving the maintenance command, the maintenance device 211, which is a robot cleaner, cleans the device main body 2A based on a preset operation procedure, and transmits a completion notification to the management server 3A when the cleaning is completed. Upon receiving the maintenance command, the maintenance device 212, which is a deodorizing device, deodorizes the device main body 2A based on a preset operation procedure.

The security mode switching section 336 switches the security mode of the device main body 2A from the normal mode to the security mode when the status determination section 333 determines that the device main body 2A is in the unused status. This security mode is a mode in which the management server 3A or the security system 8 executes security of the device main body 2A.

The security abnormality detection section 337 sets an abnormality detection command that detects an abnormality of the device main body 2A when the security mode is switched by the security mode switching section 336, and transmits the abnormality detection command to the sensor device 213 to cause the sensor device 213 to detect an abnormality of the device main body 2A. Then, the security abnormality detection section 337 detects the abnormality of the device main body 2A based on the detection result of the sensor device 213. Here, the security abnormality detection section 337 does not detect the operation of each of the maintenance devices 211 and 212 as an abnormality of the device main body 2A.

Specifically, upon receiving the abnormality detection command, the sensor device 213, which is an infrared sensor, detects the presence or absence of a moving body near the device main body 2A. In the case of detecting a moving body, the sensor device 213 transmits the detection result to the management server 3A. Here, the moving body is a person moving near the device main body 2A, a moving body, a movable object that is partially movable, or the like, and the sensor device 213 detects the movement of such a moving body. Then, the security abnormality detection section 337 detects the abnormality of the device main body 2A based on the detection result of the sensor device 213.

Note that the security abnormality detection section 337 has a non-detection function of not detecting the operation of each of the maintenance devices 211 and 212 as an abnormality of the device main body 2A, but this non-detection function may be omitted when a moving body is not provided as the maintenance device.

When the security abnormality detection section 337 detects an abnormality of the device main body 2A, the security abnormality notifying section 338 notifies the administrator of the abnormality of the device main body 2A.

Note that in the present embodiment, the security abnormality notifying section 338 notifies the administrator of the abnormality of the device main body 2A, but may notify the external security system 8 of the abnormality of the device main body 2A.

When the security mode switching section 336 switches to the security mode, the security command transmission section 339 transmits a command that executes security of the device main body 2A to the external security system 8 via the Internet 6. The security system 8 starts security of the device main body 2A by receiving this command.

Note that in the present embodiment, the management server 3A includes both the security abnormality detection section 337, the security abnormality notifying section 338, and the security command transmission section 339, and the security of the device main body 2A is performed by both the sensor device and the security system 8. However, the management server 3A may include only one of the sensor device 213 and the security system 8, and the security of the device main body 2 may be performed by either one of the sensor device 213 and the security system 8.

<Management Mode Switching Processing>

Figure 13:
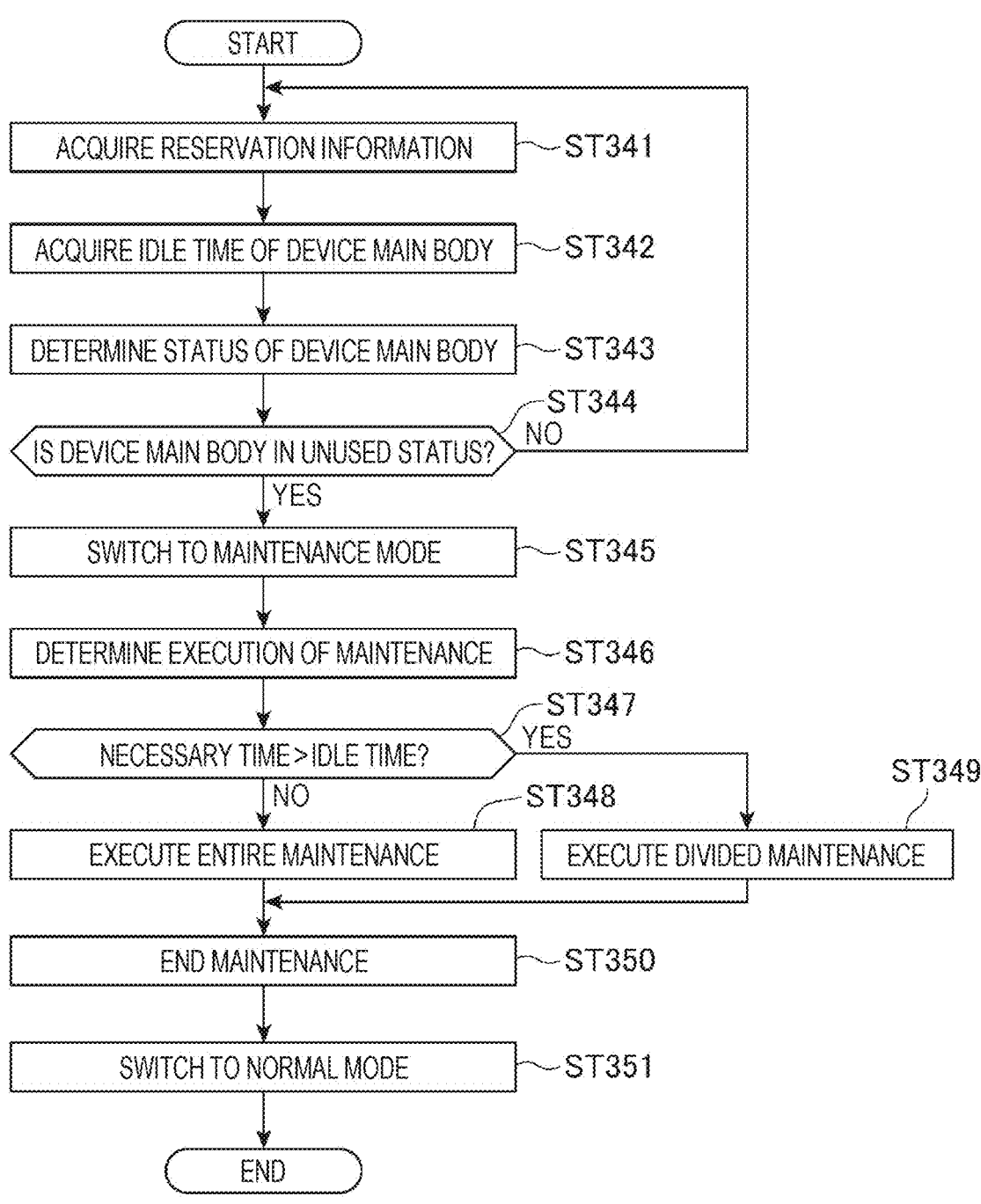
FIG. 13 is a flowchart showing switching processing of a management mode of a device main body.

FIG. 13 is a flowchart showing switching processing of the management mode of the device main body.

As shown in FIG. 13, the server-side control unit 31 of the management server 3A executes management mode switching processing in Steps ST341 to ST351 according to a predetermined program stored in the memory.

In the management mode switching processing, the reservation information setting section 311 acquires reservation information stored in the storage section 323 (Step ST341).

Then, the idle time acquisition section 332 acquires the idle time of the device main body 2A based on the reservation information acquired in Step ST341 (Step ST342).

After acquiring the idle time of the device main body 2A in Step ST342, the status determination section 333 determines whether time is an idle time of the device main body 2A and the device main body 2A is in an unused status where there is no moving body in the device main body 2A, based on the detection result of the sensor device 213 and the acquisition result of the idle time acquisition section 332 (Step ST343).

Then, the server-side control unit 31 executes the processing in Step ST345 and subsequent steps when determining that the device is in the unused status, and repeatedly executes the processing in Step ST341 and subsequent steps when determining that the device is not in the unused status (Step ST344).

In Step ST345, the management mode switching section 334 switches the management mode of the device main body 2A from the normal mode to the maintenance mode when the status determination section 333 determines that the device main body 2A is in the unused status.

After switching the management mode of the device main body 2A from the normal mode to the maintenance mode in Step ST345, the maintenance determination section 335 determines whether maintenance of the device main body 2A can be executed based on the idle time acquired by the idle time acquisition section 332 and the necessary time of each of the maintenance devices 211 and 212 (Step ST346).

Specifically, the maintenance determination section 335 compares the idle time acquired by the idle time acquisition section 332 with the necessary time for execution of maintenance by each of the maintenance devices 211 and 212 managed by the device management section 331 (Step ST347).

Then, when the necessary time is shorter than the idle time, the device management section 331 sets a maintenance command that executes maintenance of the device main body 2A, and transmits the maintenance command to each of the maintenance devices 211 and 212 to cause each of the maintenance devices 211 and 212 to execute the entire maintenance processing (Step ST348).

Here, the entire maintenance processing is a predetermined maintenance operation set for each of the maintenance devices 211 and 212, and is, for example, a maintenance that causes the maintenance device 211, which is a robot cleaner, to clean the entire range of the device main body 2A.

On the other hand, when the necessary time is longer than the idle time, the device management section 331 does not execute the maintenance of the device main body 2A, or sets a maintenance command that executes the maintenance of the device main body 2A, and transmits the maintenance command to each of the maintenance devices 211 and 212 to cause each of the maintenance devices 211 and 212 to execute divided maintenance processing (Step ST349).

Here, the divided maintenance processing is a maintenance operation that can be executed within idle time, and is, for example, a maintenance that causes the maintenance device 211, which is a robot cleaner, to execute cleaning in a half range of the device main body 2A or to execute cleaning of a portion with high priority. Such a maintenance operation that can be executed within the idle time is appropriately set for each of the maintenance devices 211 and 212.

After executing the entire maintenance processing in Step ST348 or the divided maintenance processing in Step ST349, the device management section 331 ends the maintenance of the device main body 2A (Step ST350).

After ending the maintenance of the device main body 2A in Step ST350, the management mode switching section 334 switches the management mode of the device main body 2A from the maintenance mode to the normal mode (Step ST351).

After that, the server-side control unit 31 ends the management mode switching processing.

<Security Mode Switching Processing>

Figure 14:
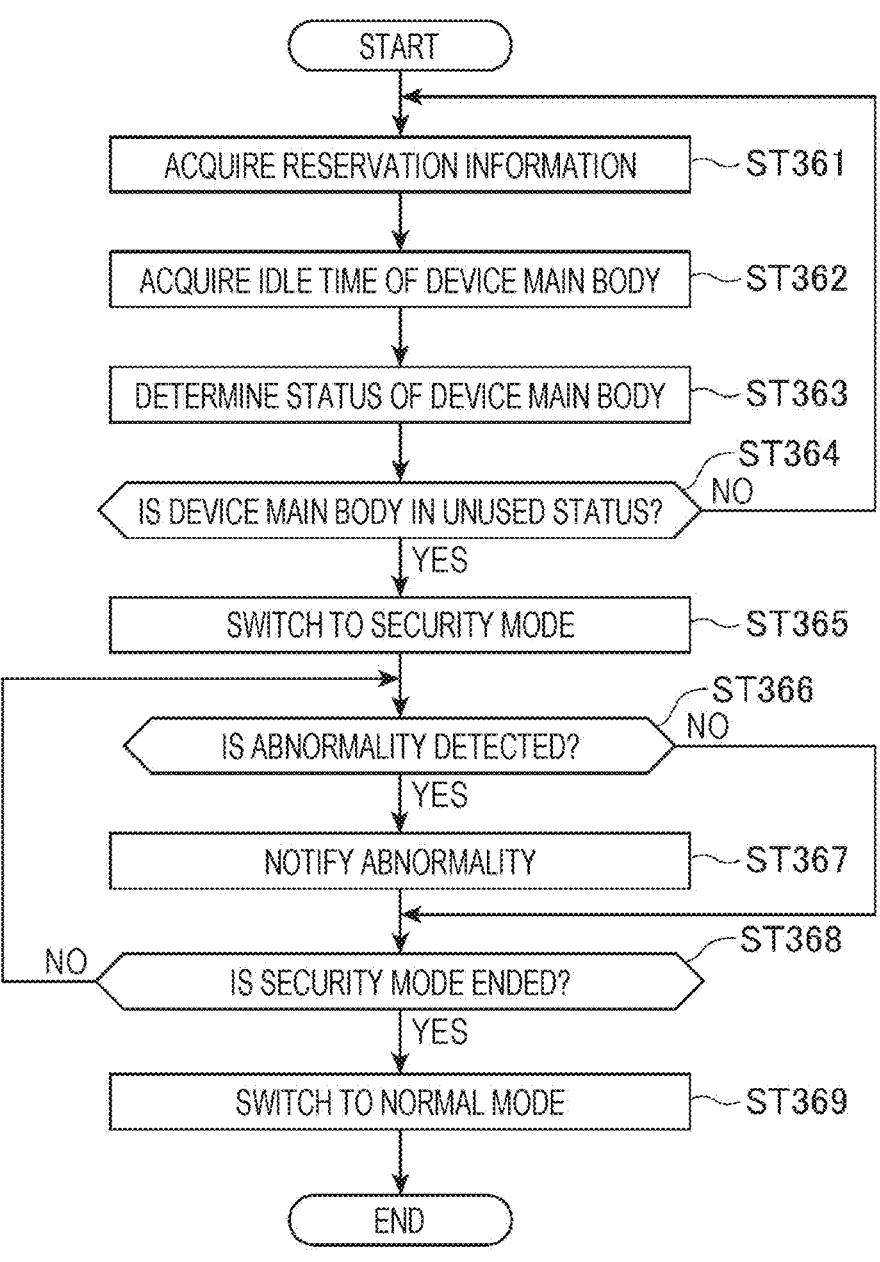
FIG. 14 is a flowchart showing switching processing of a security mode of a device main body.

FIG. 14 is a flowchart showing switching processing of the security mode of the device main body.

As shown in FIG. 14, the server-side control unit 31 of the management server 3A executes the security mode switching processing in Steps ST361 to ST369 according to a predetermined program stored in the memory.

In the security mode switching processing, the reservation information setting section 311 acquires the reservation information stored in the storage section 323 (Step ST361).

Then, the idle time acquisition section 332 acquires idle time of the device main body 2A based on the reservation information acquired in Step ST361 (Step ST362).

After acquiring the idle time of the device main body 2A in Step ST362, the status determination section 333 determines whether time is an idle time of the device main body 2A and the device main body 2A is in an unused status where there is no moving body near the device main body 2A, based on the detection result of the sensor device 213 and the acquisition result of the idle time acquisition section 332 (Step ST363).

Then, the server-side control unit 31 executes the processing in Step ST365 and subsequent steps when determining that the device is in the unused status, and repeatedly executes the processing in Step ST361 and subsequent steps when determining that the device is not in the unused status (Step ST364).

In Step ST365, the security mode switching section 336 switches the security mode of the device main body 2A from the normal mode to the security mode when the status determination section 333 determines that the device main body 2A is in the unused status.

After switching the security mode of the device main body 2A from the normal mode to the security mode in Step ST365, the security abnormality detection section 337 sets an abnormality detection command that detects an abnormality of the device main body 2A and transmits the abnormality detection command to the sensor device 213 to cause the sensor device 213 to detect an abnormality of the device main body 2A (Step ST366).

Then, when it is determined in Step ST366 that an abnormality of the device main body 2A has been detected, the security abnormality notifying section 338 notifies the administrator of the abnormality of the device main body 2A (Step ST367).

After executing the processing in Step ST367 or when determining that no abnormality of the device main body 2A is detected in Step ST366, the server-side control unit 31 determines whether to end the security mode (Step ST368).

Here, the server-side control unit 31 determines to end the security mode when it is time to transmit a movement command to the device main body 2A in order to move the device main body 2A to a reserved place on the reservation date and time to the moving unit 22, and determines not to end the security mode when it is not the time.

When it is determined in Step ST368 that the security mode is not to be ended, the server-side control unit 31 executes the processing in Step ST366 again.

On the other hand, when it is determined in Step ST368 that the security mode is ended, the security mode switching section 336 switches the security mode of the device main body 2A from the security mode to the normal mode (Step ST369).

After that, the server-side control unit 31 ends the security mode switching processing.

According to the present embodiment as described above, in addition to the same operations and effects as those of the first embodiment, the following operations and effects can be achieved.

(22) The server-side control unit 31 includes the idle time acquisition section 332 that acquires the idle time of the device main body 2A based on the reservation information, the status determination section 333 that determines whether the idle time of the device main body 2A is present based on the acquisition result of the idle time acquisition section 332, and the management mode switching section 334 that switches the management mode of the device main body 2A from the normal mode to the maintenance mode in which the maintenance of the device main body 2A is performed by the maintenance devices 211 and 212 when the status determination section 333 determines that the idle time of the device main body 2A is present. Therefore, it is possible to perform the maintenance of the device main body 2A before the reservation start time of the next subscriber. Therefore, it is possible to cause the maintenance devices 211 and 212 to execute maintenance by efficiently using the idle time of the device main body 2A, to reduce manual maintenance work, and to suppress the operation cost of the management system 1 for an unmanned mobile service device.

(23) Since the server-side control unit 31 includes the maintenance determination section 335 that determines whether the maintenance is feasible based on the idle time acquired by the idle time acquisition section 332 and the necessary time of the maintenance devices 211 and 212 when the management mode switching section 334 switches to the maintenance mode, and the device management section 331 causes the maintenance devices 211 and 212 to execute the maintenance when the maintenance determination section 335 determines that the maintenance is feasible, the management system 1 of the unmanned mobile service device can reliably end the maintenance before the reservation start time of the next subscriber.

(24) Since the status determination section 333 determines, based on the detection result of the sensor device 213 and the acquisition result of the idle time acquisition section 332, whether time is an idle time of the device main body 2A and the device main body 2A is in an unused status where there is no moving body in the device main body 2A, and the management mode switching section 334 switches the management mode of the device main body 2A from the normal mode to the maintenance mode when the status determination section 333 determines that the device main body 2A is in the unused status, it is possible to confirm that the device main body 2A is in the unused status where there is no moving body in the device main body 2A, and to execute the maintenance of the device main body 2A before the reservation start time of the next subscriber. Therefore, it is possible to cause the maintenance devices 211 and 212 to execute maintenance by efficiently using the idle time of the device main body 2A, to reduce manual maintenance work, and to suppress the operation cost of the management system 1 for an unmanned mobile service device.

(25) The server-side control unit 31 includes the security mode switching section 336 that switches the security mode from the normal mode to the security mode in which the security of the device main body 2A is executed when the status determination section 333 determines that the device main body 2A is in the unused status, and thus it is possible to execute the security of the device main body 2A before the reservation start time of the next subscriber.

(26) The server-side control unit 31 includes the security abnormality detection section 337 that detects an abnormality of the device main body 2A based on the detection result of the sensor device 213 when the security mode switching section 336 switches to the security mode, and the security abnormality notifying section 338 that notifies the administrator of the abnormality of the device main body 2A when the security abnormality detection section 337 detects the abnormality of the device main body 2A, and thus the administrator can easily grasp the abnormality of the device main body 2A.

(27) Since the security abnormality detection section 337 does not detect the operation of the maintenance devices 211 and 212 as an abnormality of the device main body 2A, the server-side control unit 31 can cause the maintenance devices 211 and 212 to execute maintenance even when the security mode switching section 336 switches to the security mode.

(28) Since the server-side control unit 31 includes the security command transmission section 339 that transmits a command that executes security of the device main body 2A to the external security system 8 via the Internet 6 when the security mode is switched to the security mode by the security mode switching section 336, the device main body 2A does not necessarily have to include a device that executes security of the device main body 2A, and it is possible to simplify the configuration of the device main body 2A, and to further suppress the operation cost of the management system 1 for an unmanned mobile service device.

Third Embodiment

In the following, a third embodiment of the present invention will be described with reference to the drawings.

Figure 15:
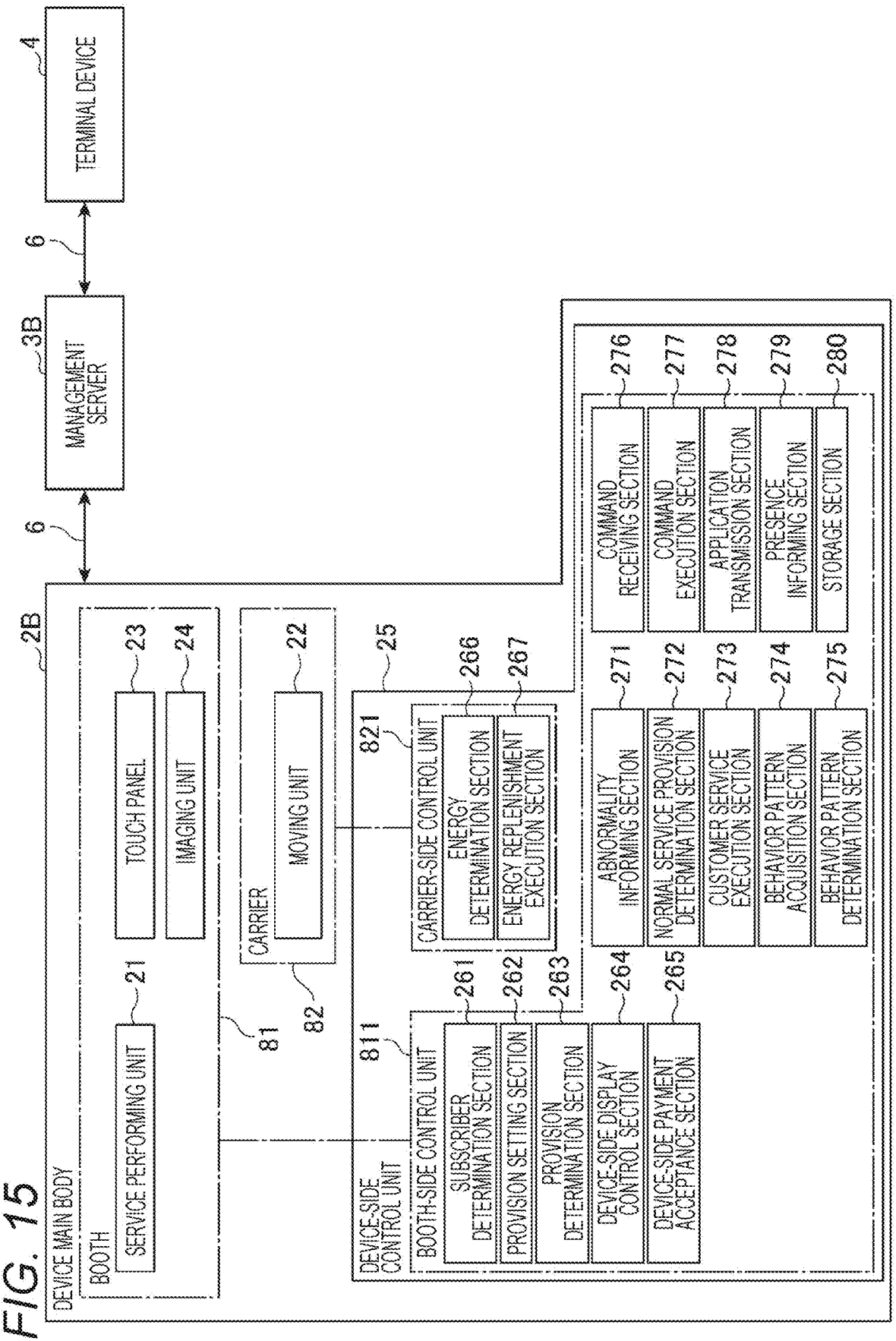
FIG. 15 is a schematic configuration diagram showing functions of a device main body according to a third embodiment of the present invention.

FIG. 15 is a schematic configuration diagram showing functions of a device main body according to the third embodiment of the present invention.

In the first embodiment, the management system 1 for an unmanned mobile service device includes the device main body 2 and the management server 3, and the device main body 2 includes the service performing unit 21, the moving unit 22, the touch panel 23, the imaging unit 24, and the device-side control unit 25.

On the other hand, in the present embodiment, as shown in FIG. 15, a management system 1 for an unmanned mobile service device includes a device main body 2B and a management server 3B, and the device main body 2B includes a booth 81 including a service performing unit 21, a touch panel 23, and an imaging unit 24, and a carrier 82 including a moving unit 22 that moves the booth 81.

Note that in the following description, the components already described are denoted by the same reference numerals, and the description thereof is omitted.

The device-side control unit 25 includes a booth-side control unit 811 that is provided in the booth 81 and controls the booth 81, and a carrier-side control unit 821 that is provided in the carrier 82 and controls the carrier 82.

The booth-side control unit 811 has other functions (a subscriber determination section 261 to a device-side payment acceptance section 265 and an abnormality informing section 271 to a storage section 280) except an energy determination section 266 and an energy replenishment execution section 267.

The carrier-side control unit 821 has functions of the energy determination section 266 and the energy replenishment execution section 267. Here, the energy determination section 266 and the energy replenishment execution section 267 are configured to supply energy not only to the carrier 82 but also to the booth 81.

Note that in the present embodiment, the carrier-side control unit 821 has the functions of the energy determination section 266 and the energy replenishment execution section 267, and the booth-side control unit 811 does not have the functions of the energy determination section and the energy replenishment execution section. However, when it is necessary to supply energy to the booth, the booth-side control unit and the carrier-side control unit may have the functions of both the energy determination section and the energy replenishment execution section.

Here, in the present embodiment, the management system 1 for an unmanned mobile service device includes a plurality of device main bodies 2B. Each of the booth 81 and the carrier 82 in each device main body 2B is detachably formed.

Note that in the present invention, the booth and the carrier may be one set or a plurality of sets. In addition, in the present invention, the number of booths and the number of carriers are not necessarily the same, and the device main body only has to include at least one booth and a plurality of carriers.

Figure 16:
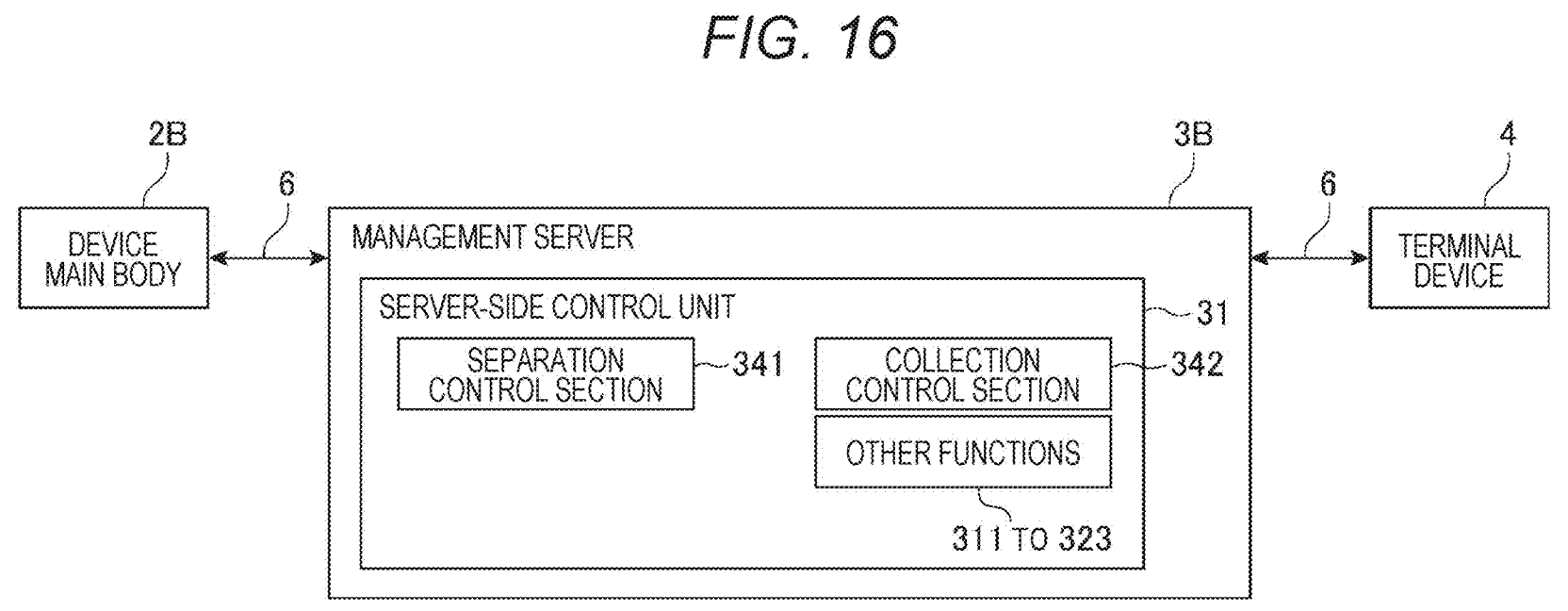

FIG. 16 is a schematic configuration diagram showing functions of the management server.

As shown in FIG. 16, the server-side control unit 31 of the management server 3B has a functional configuration (sections 311 to 323) similar to that of the management server 3 in the first embodiment, and further includes a separation control section 341 and a collection control section 342.

The separation control section 341 causes the moving unit 22 to move the device main body 2B to a reserved place based on reservation information by the movement control section 312, and then separates the booth 81 and the carrier 82, so that the carrier 82 is allowed to freely move independently.

The collection control section 342 moves the carrier 82 to a place where the booth 81 is present based on establishment of a predetermined condition, and then collects the booth 81 by coupling the booth 81 to the carrier 82. Note that, in the present embodiment, a condition that the payment has been accepted or a condition that the reservation end time has come is set as the predetermined condition, but other conditions may be set as the predetermined condition.

Note that in the present embodiment, the collection control section 342 collects the booth 81 by moving the carrier 82 to a place where the booth 81 is present based on establishment of a predetermined condition and then coupling the booth 81 to the carrier 82. On the other hand, the booth does not necessarily have to be collected by the carrier, and may be collected by a business operator or the like, for example. In short, in the present invention, the booth and the carrier may only have to be detachably formed.

According to the present embodiment as described above, in addition to the same operations and effects as those of the first embodiment, the following operations and effects can be achieved.

(29) The device main body 2B includes the booth 81 provided with the service performing unit 21 and the carrier 82 provided with the moving unit 22 that moves the booth 81, and the booth 81 and the carrier 82 are detachably formed. Therefore, after the device main body 2B is moved to a reserved place by the moving unit 22 by the movement control section 312 based on the reservation information, the booth 81 and the carrier 82 are separated, and thus the carrier 82 can be moved independently. Therefore, the management system 1 for an unmanned mobile service device can efficiently operate by individually controlling the booth 81 and the carrier 82.

(30) The device main body 2B includes at least one booth 81 and a plurality of carriers 82, and each of the booth 81 and the carrier 82 is detachably formed. Therefore, for example, after the booth 81 is moved to a reserved place by a certain carrier 82, the booth 81 can be collected by another carrier 82. Therefore, the management system 1 for an unmanned mobile service device can efficiently operate by individually controlling the booth 81 and the carrier 82.

(31) The server-side control unit 31 includes the collection control section 342 that collects the booth 81 by coupling the booth 81 and the carrier 82 after moving the carrier 81 to a place where the booth 81 is present based on establishment of a predetermined condition. Therefore, for example, it is possible to cause the carrier 82 to collect the booth 81 under a predetermined condition that the use of the service by the subscriber has ended. Therefore, the management system 1 for an unmanned mobile service device can efficiently operate by individually controlling the booth 81 and the carrier 82.

Modifications of Embodiments

Note that the present invention is not limited to the foregoing embodiments, and modifications, improvements, and the like within a range in which the object of the present invention can be achieved are included in the present invention.

For example, in each of the foregoing embodiments, various functions of the management system 1 for an unmanned mobile service device are distributed and performed in the device main bodies 2, 2A, and 2B and the management servers 3, 3A, and 3B. However, any function may be distributed and performed in either of the device main bodies 2, 2A, and 2B and the management servers 3, 3A, and 3B, may be integrally mounted without distribution, and may be appropriately designed as long as various functions of the management system 1 for an unmanned mobile service device can be realized. For example, in each of the foregoing embodiments, the service performing unit 21 is performed in the device main bodies 2, 2A, and 2B, but may be connected to the management servers 3, 3A, and 3B via the Internet 6.

In each of the embodiments, the device main bodies 2, 2A, and 2B and the management servers 3, 3A, and 3B may be configured using a centralized server device, or may be of a distributed management type. For example, a device using a distributed transaction ledger represented by a blockchain may be used, and any device may be used as long as the device can manage reservation information and can transmit and receive various types of information for processing.

In each of the foregoing embodiments, the management servers 3, 3A, and 3B and the reservation site 5 are separately provided and connected to each other via the Internet 6. However, the present invention is not limited to this. The management servers 3, 3A, and 3B and the reservation site 5 may be provided at a single site, or the functions of the management servers 3, 3A, and 3B and the reservation site 5 may be configured using a plurality of devices distributed on the Internet 6.

In each of the foregoing embodiments, the reservation information setting section 311 receives the reservation of the device main body 2 via the terminal device 4 to store and set the reservation information regarding the subscriber, the reserved place, and the reservation date and time (reservation start time and reservation end time) in the storage section 323.

On the other hand, the reservation information setting section may receive the reservation of the device main body via the subscriber input unit to store and set the reservation information regarding only the reserved place in the storage section.

In each of the foregoing embodiments, the storage section 280 stores in advance a plurality of samples of normal behavior patterns of the subscriber, and the behavior pattern determination section 275 compares the plurality of samples of behavior patterns stored in the storage section 280 with the behavior pattern acquired by the behavior pattern acquisition section 274 to determine whether the plurality of samples of behavior patterns stored in the storage section 280 are different from the behavior pattern acquired by the behavior pattern acquisition section 274, and detects the abnormality occurring in the device main body 2 when it is determined that the plurality of samples of behavior patterns stored in the storage section 280 are different from the behavior pattern acquired by the behavior pattern acquisition section 274.

On the other hand, the behavior pattern storage section may store a sample of an abnormal behavior pattern of the subscriber, and the behavior pattern determination section may compare the sample of the behavior pattern stored in the behavior pattern storage section with the behavior pattern acquired by the behavior pattern acquisition section to determine whether the samples match, and detect the abnormality occurring in the service device when it is determined that the samples match.

According to such a configuration, since the device-side control unit includes the behavior pattern determination section that compares the sample of the abnormal behavior pattern of the subscriber of the service device with the behavior pattern acquired by the behavior pattern acquisition section to determine whether the sample of the abnormal behavior pattern matches the behavior pattern acquired by the behavior pattern acquisition section, and detects the abnormality occurring in the service device when the sample of the abnormal behavior pattern matches the behavior pattern acquired by the behavior pattern acquisition section, for example, by storing a behavior suspicious behavior pattern such as disassembling the service device in the behavior pattern storage section as the abnormal behavior pattern, an intruder with the behavior suspicious behavior pattern can be detected as an abnormality by the behavior pattern determination section, and it is possible to improve the safety of the service device.

In each of the foregoing embodiments, the command creation section 319 creates the extension command that notifies whether the reserved time can be extended according to the reservation status of the device main bodies 2, 2A, and 2B, and the command execution section 277 of the device main bodies 2, 2A, and 2B notifies the subscriber whether the reserved time can be extended. However, the function of notifying whether the extension can be performed can be omitted. In each of the foregoing embodiments, each of the device main bodies 2, 2A, and 2B includes the touch panel 23 that receives the extension application input from the subscriber and the application transmission section 278 that transmits the extension application to the management server 3, 3A, or 3B, and the management server 3, 3A, or 3B includes the application receiving section 321 that receives the extension application. However, the function of inputting and transmitting the extension application can be omitted. Further, the functions related to the notification and application of the extension may be executed using the terminal device 4 of the subscriber via the reservation site 5.

In each of the foregoing embodiments, the command creation section 319 creates the warning command that notifies the subscriber of the warning when the subscriber is present even after the reservation end time, and the command execution section 277 of each of the device main bodies 2, 2A, and 2B notifies the subscriber of the fact that the reservation end time has passed. However, the function of notifying the time excess can be omitted. In addition, the function of notifying the time excess may be executed using the terminal device 4 of the subscriber via the reservation site 5.

The command creation section may create an end command that causes the service performing unit to end the provision of the service when the reservation end time comes based on the reservation information, and the command execution section may cause the service performing unit to end the provision of the service based on the end command.

According to such a configuration, since the command execution section causes the service performing unit to end the provision of the service based on the end command, the service device can automatically end the provision of the service when the reservation termination time comes.

In addition, in the management system 1 for an unmanned mobile service device according to each of the foregoing embodiments, the management system 1 may include the first device main body and the second service device different from the first service device, the reservation information setting section may store reservation information regarding a service desired by the subscriber in the storage section, the server-side control unit may include the service device selection section that selects at least one of the first service device and the second service device as a service device including a service desired by the subscriber based on the reservation information, and the movement control section may move the service device selected by the service device selection section to the reserved place by the moving unit based on the reservation information.

According to such a configuration, the server-side control unit includes the service device selection section that selects at least one of the first service device and the second service device as the service device including the service desired by the subscriber based on the reservation information, and the movement control section causes the moving unit to move the service device selected by the service device selection section to the reserved place based on the reservation information. Therefore, the subscriber can reliably receive the provision of the service performed by the service performing unit of the service device by going to the reserved place or waiting at the reserved place.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A management system for an unmanned mobile service device comprising:
    a service device that performs a service;
    a maintenance device that performs maintenance of the service device;
    a detection unit that detects presence or absence of a moving body near the service device,
    a management server that is connected to the service device via a communication line and manages the service device; and
    a subscriber input unit that is connected to the management server via the communication line and accepts an operation input by a subscriber, wherein
    the service device includes:
        a service performing unit that performs a service without internally accepting a user,
        a moving unit that moves the service device, and a device-side control unit that controls the service device, the management server includes:

a server-side control unit that controls the management server, the server-side control unit includes:

a reservation information setting section that accepts a reservation of the service device via the subscriber input unit to store reservation information regarding a reserved place in a storage section and sets the reservation information, a movement control section that causes the moving unit to move the service device to the reserved place based on the reservation information, a reservation management section that manages the reservation information including a reservation start time and a reservation end time, an idle time acquisition section that acquires idle time of the service device based on the reservation information, a status determination section that determines whether time is idle time of the service device based on an acquisition result of the idle time acquisition section, and determines, based on the detection result of the detection unit and the acquisition result of the idle time acquisition section, whether time is an idle time of the service device and the service device is in an unused status where there is no moving body near the service device, a management mode switching section that switches a management mode of the service device from a normal mode to a maintenance mode in which maintenance of the service device is executed by the maintenance device when the status determination section determines: that time is idle time of the service device, and that the service device is in the unused status; and a security mode switching section that switches a security mode from a normal mode to a security mode that executes security of the service device when the status determination section determines that the service device is in the unused status.

2. The management system for an unmanned mobile service device according to claim 1, wherein the service performing unit performs the service by receiving identification information issued from the management server to the subscriber input unit.

3. The management system for an unmanned mobile service device according to claim 1, wherein the service performing unit performs the service by accepting an operation input transmitted from the subscriber input unit.

4. The management system for an unmanned mobile service device according to claim 1, wherein the subscriber input unit includes:

a reservation-side display unit that displays information and a reservation-side input unit that accepts an operation input, and the server-side control unit includes:

a server-side display control section that causes the reservation-side display unit to display availability of the service device and time necessary for the reserved place based on the reservation information.

5. The management system for an unmanned mobile service device according to claim 1, wherein the movement control section applies permission to the subscriber when the service device moves in a movable area by obtaining the permission of the subscriber.

6. The management system for an unmanned mobile service device according to claim 1, wherein the reservation information setting section stores reservation information related to a reservation date and time in the storage section, and the movement control section causes the moving unit to move the service device to the reserved place on the reservation date and time based on the reservation information.

7. The management system for an unmanned mobile service device according to claim 6, wherein the server-side control unit includes a movement status notifying section that notifies a subscriber of a movement status of the service device.

8. The management system for an unmanned mobile service device according to claim 1, wherein the reservation information setting section stores reservation information regarding a subscriber in the storage section, and the device-side control unit includes a subscriber determination section that determines whether a person is the subscriber based on the reservation information, and a provision setting section that causes the service performing unit to perform a service when the subscriber determination section determines that the person is the subscriber.

9. The management system for an unmanned mobile service device according to claim 8, wherein the service device includes:

a device-side display unit that displays information, and a device-side input unit that accepts an operation input, and the device-side control unit includes:

a device-side display control section that causes the device-side display unit to display a provision amount of a service performed by the service performing unit, and a device-side payment acceptance section that accepts payment according to the provision amount of the service performed by the service performing unit via the device-side input unit.

10. The management system for an unmanned mobile service device according to claim 9, wherein the subscriber input unit includes:

a reservation-side display unit that displays information, and a reservation-side input unit that accepts an operation input, and the server-side control unit includes:

a server-side display control section that causes the reservation-side display unit to display the provision amount of the service performed by the service performing unit, and a server-side payment acceptance section that accepts payment according to the provision amount of the service performed by the service performing unit via the reservation-side input unit.

11. The management system for an unmanned mobile service device according to claim 1, wherein the device-side control unit includes a provision determination section that determines whether the service performing unit is caused to perform a service.

12. The management system for an unmanned mobile service device according to claim 1, wherein the server-side control unit includes a place securing execution section that secures a reserved place based on the reservation information.

13. The management system for an unmanned mobile service device according to claim 1, wherein the device-side control unit includes:

an energy determination section that determines whether energy of the service device is insufficient; and an energy replenishment execution section that executes energy replenishment of the service device when the energy determination section determines that the energy is insufficient.

14. The management system for an unmanned mobile service device according to claim 13, wherein the energy replenishment execution section receives energy supply from another service device and executes the energy replenishment of the service device.

15. The management system for an unmanned mobile service device according to claim 1, wherein the subscriber input unit includes:

a reservation-side display unit that displays information, and the server-side control unit includes:

a server-side display control section that causes the reservation-side display unit to display a service performed by the service performing unit.

16. The management system for an unmanned mobile service device according to claim 15, comprising:

a first service device; and a second service device different from the first service device, wherein the reservation information setting section stores reservation information related to a service desired by a subscriber in the storage section, and the server-side control unit includes:

a service device selection section that selects at least one of the first service device and the second service device as the service device including the service desired by the subscriber based on the reservation information, and the movement control section causes the moving unit to move the service device selected by the service device selection section to a reserved place based on the reservation information.

17. The management system for an unmanned mobile service device according to claim 1, wherein the device-side control unit includes:

an abnormality informing section that informs the management server of an abnormality of the service device via the communication line when an abnormality occurring in the service device is detected, and the server-side control unit includes:

an abnormality notifying section that notifies an administrator of the abnormality of the service device when the abnormality informing section notifies the abnormality of the service device.

18. The management system for an unmanned mobile service device according to claim 17, wherein the device-side control unit includes a normal service provision determination section that determines whether the service performing unit is normally performing a service and detects an abnormality occurring in the service device when it is determined that the service performing unit is not normally performing the service.

19. The management system for an unmanned mobile service device according to claim 18, wherein the service device includes:

a customer service unit that serves a subscriber, the device-side control unit includes:

a customer service execution section that executes customer service by the service unit when the normal service provision determination section determines that the service performing unit is normally performing the service.

20. The management system for an unmanned mobile service device according to claim 17, wherein the service device includes:

an imaging unit that captures an image, and the device-side control unit includes:

a behavior pattern storage section that stores a sample of a normal behavior pattern of a subscriber, a behavior pattern acquisition section that acquires a behavior pattern of the subscriber based on the image captured by the imaging unit, and a behavior pattern determination section that compares the sample of the behavior pattern stored in the behavior pattern storage section with the behavior pattern acquired by the behavior pattern acquisition section to determine whether the sample of the behavior pattern is different from the behavior pattern acquired by the behavior pattern acquisition section, and detects an abnormality occurring in the service device when it is determined that the sample of the behavior pattern is different from the behavior pattern acquired by the behavior pattern acquisition section.

21. The management system for an unmanned mobile service device according to claim 17, wherein the service device includes:

an imaging unit that captures an image, and the device-side control unit includes:

a behavior pattern storage section that stores a sample of an abnormal behavior pattern of a subscriber, a behavior pattern acquisition section that acquires a behavior pattern of a subscriber based on the image captured by the imaging unit, and a behavior pattern determination section that compares the sample of the behavior pattern stored in the behavior pattern storage section with the behavior pattern acquired by the behavior pattern acquisition section to determine whether the sample of the behavior pattern stored in the behavior pattern storage section matches the behavior pattern acquired by the behavior pattern acquisition section, and detects an abnormality occurring in the service device when the sample of the behavior pattern stored in the behavior pattern storage section matches the behavior pattern acquired by the behavior pattern acquisition section.

22. The management system for an unmanned mobile service device according to claim 1, wherein the server-side control unit includes:

a command creation section that creates a command for the service device, and a command transmission section that transmits the command to the service device via the communication line, and the device-side control unit includes:

a command receiving section that receives the command from the command transmission section, and a command execution section that executes a predetermined operation based on the command received by the command receiving section.

23. The management system for an unmanned mobile service device according to claim 22, wherein the command creation section creates, based on the reservation information, an end command that causes the service performing unit to end provision of a service when the reservation end time comes, and the command execution section causes the service performing unit to end the provision of the service based on the end command.

24. The management system for an unmanned mobile service device according to claim 23, wherein the command creation section creates a notification command that notifies a reservation end time based on the reservation information, and the command execution section notifies the subscriber of the reservation end time based on the notification command.

25. The management system for an unmanned mobile service device according to claim 23, wherein the reservation management section manages the reservation information including a reservation status after the reservation end time, the command creation section creates an extension command that notifies whether the reserved time can be extended according to the reservation status based on the reservation information, and the command execution section notifies a subscriber of whether the reserved time can be extended based on the extension command.

26. The management system for an unmanned mobile service device according to claim 25, wherein the service device includes:

an extension acceptance unit that accepts an input of an extension application by a subscriber, the device-side control unit includes:

an application transmission section that transmits the extension application to the management server via a communication line when the extension acceptance unit accepts the input of the extension application, the server-side control unit includes:

an application receiving section that receives the extension application transmitted from the application transmission section, and the reservation management section changes a reservation end time and updates the reservation information based on the extension application received by the application receiving section.

27. The management system for an unmanned mobile service device according to claim 1, wherein the server-side control unit includes:

a device management section that manages a necessary time for execution of maintenance by the maintenance device, and a maintenance determination section that determines whether maintenance is feasible based on idle time acquired by the idle time acquisition section and the necessary time of the maintenance device when the management mode switching section switches to the maintenance mode, and the device management section causes the maintenance device to execute the maintenance when the maintenance determination section determines that the maintenance is feasible.

28. The management system for an unmanned mobile service device according to claim 1, wherein the server-side control unit includes:

a security abnormality detection section that detects an abnormality of the service device based on a detection result of the detection unit when the security mode switching section switches to the security mode, and a security abnormality notifying section that notifies an administrator of the abnormality of the service device when the security abnormality detection section detects the abnormality of the service device.

29. The management system for an unmanned mobile service device according to claim 28, wherein the security abnormality detection section does not detect an operation of the maintenance device as an abnormality of the service device.

30. The management system for an unmanned mobile service device according to claim 1, wherein the server-side control unit includes a security command transmission section that transmits a command that executes security of the service device to an external security system via a communication line when the security mode switching section switches to the security mode.

31. The management system for an unmanned mobile service device according to claim 1, wherein the service device includes:

a booth including the service performing unit, and a carrier including the moving unit that moves the booth, the device-side control unit includes:

a booth-side control unit that controls the booth, and a carrier-side control unit that controls the carrier, and the booth and the carrier are detachably formed.

32. The management system for an unmanned mobile service device according to claim 31, wherein the service device includes at least one of the booths, and a plurality of the carriers, and each of the booth and the carrier is detachably formed.

33. The management system for an unmanned mobile service device according to claim 31, wherein the server-side control unit includes:

a separation control section that separates the booth and the carrier after the movement control section causes the moving unit to move the service device to a reserved place based on the reservation information, so that the carrier is allowed to freely move independently, and a collection control section that collects the booth by coupling the booth to the carrier after moving the carrier to a place where the booth is present based on establishment of a predetermined condition.

* * * * *